(12) United States Patent
Karelin et al.

(10) Patent No.: US 11,392,961 B2
(45) Date of Patent: *Jul. 19, 2022

(54) SYSTEM AND METHOD FOR CREATING A SOCIAL-NETWORKING ONLINE COMMUNITY

(71) Applicant: Viacom International Inc., New York, NY (US)

(72) Inventors: Alex Karelin, Los Angeles, CA (US); Evan Rifkin, Marina Del Rey, CA (US)

(73) Assignee: VIACOM INTERNATIONAL INC., New York, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 16/210,949

(22) Filed: Dec. 5, 2018

(65) Prior Publication Data

US 2019/0108533 A1  Apr. 11, 2019

Related U.S. Application Data

(63) Continuation of application No. 12/121,403, filed on May 15, 2008, now Pat. No. 10,181,125.

(Continued)

(51) Int. Cl.
*G06Q 10/00* (2012.01)
*G06Q 30/02* (2012.01)
(Continued)

(52) U.S. Cl.
CPC ............. *G06Q 30/02* (2013.01); *G06Q 10/10* (2013.01); *G06Q 20/102* (2013.01); *G06Q 40/12* (2013.12); *G06Q 50/01* (2013.01)

(58) Field of Classification Search
CPC ........ G06Q 30/02; G06Q 40/12; G06Q 10/10; G06Q 20/102; G06Q 50/01; G06Q 20/384; G06Q 50/30; G06Q 20/38
See application file for complete search history.

(56) References Cited

U.S. PATENT DOCUMENTS 6,327,590 B1 * 12/2001 Chidlovskii ........ G06F 16/9535
707/734
6,433,795 B1 * 8/2002 MacNaughton .... H04L 12/1813
715/738

(Continued)

FOREIGN PATENT DOCUMENTS

CN          1531700        9/2004
WO    WO-2006017622 A2 *  2/2006  ........... H04L 67/306
WO    WO-2008091695 A1 *  7/2008  ............. G06Q 30/02

OTHER PUBLICATIONS

What is SplashCast? (retrieved from the internet archive at https://web.archive.org/web/20061207052822/https://splashcast.wordpress.com/what_is_splashcast-media-syndication/).*

*Primary Examiner* — Gabrielle A McCormick
(74) *Attorney, Agent, or Firm* — Fay Kaplun & Marcin, LLP

(57) ABSTRACT

A system and method are provided for creating a social-networking community and enabling the social-networking community to interoperate with other social-networking communities within a network of social-networking communities. The method includes creating a core profile that links a user member's identify to plurality of social-networking communities of the network. The system enables user identity information, content, and friend information to be shared across social-networking communities of the network. The system also enables community content to be shared and tracked across social-networking communities of the network.

21 Claims, 15 Drawing Sheets

Related U.S. Application Data

(60) Provisional application No. 60/938,150, filed on May 15, 2007.

(51) Int. Cl.
*G06Q 10/10* (2012.01)
*G06Q 20/10* (2012.01)
*G06Q 50/00* (2012.01)
*G06Q 40/00* (2012.01)

(56) References Cited

U.S. PATENT DOCUMENTS

| | | | | |
|---|---|---|---|---|
| 7,269,590 B2 * | 9/2007 | Hull | ............ | G06Q 10/10 707/770 |
| 7,647,306 B2 * | 1/2010 | Rose | ............ | G06F 16/24578 707/999.003 |
| 2001/0047276 A1 * | 11/2001 | Eisenhart | ............ | G06Q 10/10 705/37 |
| 2002/0023132 A1 * | 2/2002 | Tornabene | ............ | G06Q 10/10 709/205 |
| 2002/0023230 A1 * | 2/2002 | Bolnick | ............ | H04L 67/10 726/28 |
| 2002/0091798 A1 * | 7/2002 | Joshi | ............ | G06F 16/9535 709/219 |
| 2002/0147626 A1 * | 10/2002 | Zagotta | ............ | G06Q 10/0635 705/7.15 |
| 2002/0188554 A1 * | 12/2002 | Holbrook | ............ | G06Q 10/10 705/37 |
| 2003/0163510 A1 * | 8/2003 | Janssen | ............ | H04L 63/101 718/100 |
| 2003/0177248 A1 * | 9/2003 | Brown | ............ | G06F 21/6218 709/229 |
| 2003/0220975 A1 * | 11/2003 | Malik | ............ | H04L 63/105 709/205 |
| 2004/0098465 A1 * | 5/2004 | Seo | ............ | G06Q 30/02 709/217 |
| 2005/0177385 A1 * | 8/2005 | Hull | ............ | G06Q 50/01 705/319 |
| 2005/0216300 A1 * | 9/2005 | Appelman | ............ | G06Q 50/01 705/319 |
| 2005/0216550 A1 * | 9/2005 | Paseman | ............ | G06Q 10/00 709/202 |
| 2006/0010251 A1 * | 1/2006 | Mrsic-Flogel | ............ | H04L 29/12009 709/245 |
| 2006/0149759 A1 * | 7/2006 | Bird | ............ | G06F 16/9535 |
| 2006/0200432 A1 * | 9/2006 | Flinn | ............ | G06N 7/02 706/12 |
| 2007/0061266 A1 * | 3/2007 | Moore | ............ | G06Q 50/00 705/51 |
| 2007/0124208 A1 * | 5/2007 | Schachter | ............ | G06F 40/117 705/310 |
| 2007/0179835 A1 * | 8/2007 | Ott | ............ | G06Q 30/0278 705/306 |
| 2007/0220048 A1 * | 9/2007 | Ott | ............ | H04H 20/82 |
| 2007/0245020 A1 * | 10/2007 | Ott | ............ | G06Q 30/00 709/225 |
| 2008/0077574 A1 * | 3/2008 | Gross | ............ | G06Q 30/0269 |
| 2008/0082550 A1 * | 4/2008 | Ahopelto | ............ | G06Q 10/109 |
| 2008/0086689 A1 * | 4/2008 | Berkley | ............ | G06F 16/986 715/731 |
| 2008/0097825 A1 * | 4/2008 | Leach | ............ | G06Q 30/02 705/37 |
| 2008/0126476 A1 * | 5/2008 | Nicholas | ............ | G06Q 10/10 709/203 |
| 2008/0189189 A1 * | 8/2008 | Morgenstern | ............ | G06Q 30/0641 705/12 |
| 2008/0201156 A1 * | 8/2008 | Abhyanker | ............ | G06Q 10/10 705/1.1 |
| 2008/0201225 A1 * | 8/2008 | Maharajh | ............ | G06F 16/7867 705/14.43 |
| 2008/0243933 A1 * | 10/2008 | Holtzman | ............ | G06Q 10/10 |
| 2009/0132349 A1 * | 5/2009 | Berkley | ............ | G06F 16/986 715/202 |
| 2009/0144075 A1 * | 6/2009 | Flinn | ............ | G06N 7/02 705/318 |

* cited by examiner

Created a Community - 12:55 | 02.12.07

Photographic
Content
Item - 25

Tokyo Police Club

No Longer Friends With - 12:15 | 02.12.07

Photographic
Content
Item - 26 charlietrippy
Tampa, FL

« previous | next »

Guest Book

Photographic
Content
Item - 27

Hi Evan. Say something to Jerri?

Post a Comment

Ally_tui7
Watup girl? Like when are we going to hit the slopes?

Photographic
Content
Item - 28 added -- 12:34am | 02.12.07

Naughty84
Hey Hottie!

Photographic
Content
Item - 29 added -- 8:34am | 02.14.07

JoMa
Ipsum dolor sit amet, consectetuer adipiscing elit,
sed diam nonummy nibh euismod tincidunt ut.

Photographic
Content
Item - 30 added -- 8:34am | 02.14.07

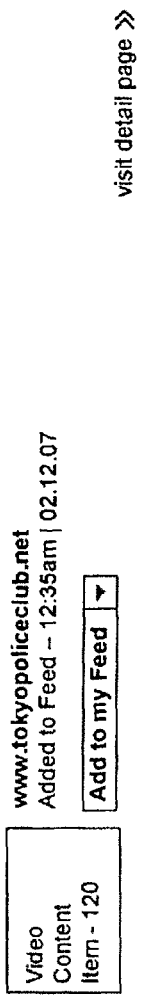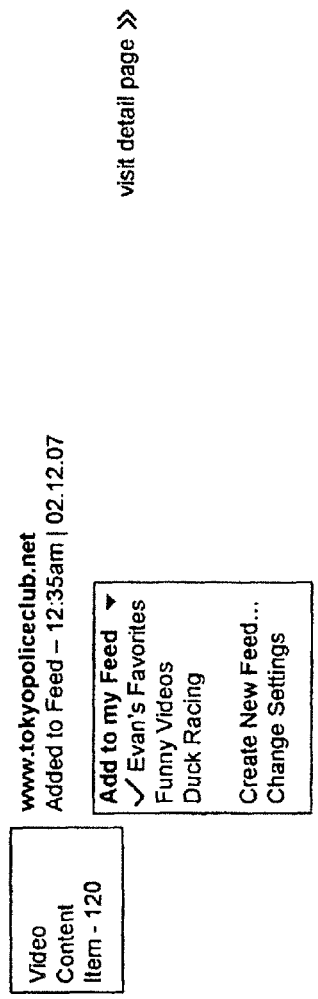
FIG. 7A
FIG. 7B

| | | | | | Hi Evan | Inbox (3) | Subscriptions (4) |
| | | | | | I'm Happy ☺ Quick Menu |

File Edit View History Bookmarks Tools Help

Home
Community
My Profile
Members
Discussion
Photos
Videos
Feeds
Sign Up

Manage Feed Content

« Back to My Feeds

Featured – 25 items in feed

| Photographic Content Item – 122 | Lorem ipsum dolor sit amet, consectetuer adipiscing elit, sed do eiusmod tempor incididunt ut labore et dolore magna elque. Ut enim ad minim veniam, quis nostrud exercitationulamco laboris nisl ut aliquip ex | Photographic Content Item – 1 |

| Position | content Type / Title | Reorder | Delete | Change Position |
|---|---|---|---|---|
| 1 | Lorem ipsum dolor sit emet, consectetur | ↕ | | |
| 2 | Lorem ipsum dolor sit emet, consectetur | ↕ | ☒ | 1 |
| 3 | Lorem ipsum dolor sit emet, consectetur | ↕ | ☒ | 2 |
| 4 | Lorem ipsum dolor sit emet, consectetur | ↕ | ☒ | 3 |
| 5 | Lorem ipsum dolor sit emet, consectetur | ↕ | ☒ | 4 |
| 6 | Lorem ipsum dolor sit emet, consectetur | ↕ | ☒ | 5 |
| 7 | | | ☒ | 6 |
| | | | | 7 |

[Update]

FIG. 8A

SYSTEM AND METHOD FOR CREATING A SOCIAL-NETWORKING ONLINE COMMUNITY

CROSS-REFERENCE TO RELATED APPLICATION

The present application is a Continuation Application of U.S. patent application Ser. No. 12/121,403 filed on May 15, 2008, now U.S. Pat. No. 10,181,125; which claims priority to U.S. Provisional Application Ser. No. 60/938,150 filed on May 15, 2007. The disclosures of these application(s) and/or patent(s) are incorporated herein by reference.

BACKGROUND OF THE INVENTION

Field of the Invention

The present invention generally relates to online social-networking, and more particularly to methods and systems for creating a social-networking community and enabling the social-networking community to interoperate with other social-networking communities within a network of social-networking communities.

Related Art

It is noted that the terms "social-networking community," and "social-networking system," may be used interchangeably herein to refer to methods and systems for creating social-networking websites that enable publisher members to manage social-networking interactions, and that enable user members to create profiles establishing user member identities, to develop online relationships with other user members, and to manage content items.

It is further noted that the terms "website," and "web-server" may be used interchangeably herein to refer to methods and systems for generating Hypertext Markup Language (HTML) documents, and for sending and receiving information using the Hypertext Transfer Protocol (HTTP) and the Hypertext Transfer Protocol over Secure Socket Layer Protocol (HTTPS).

In conventional social-networking systems, user members of a social-networking community are able to have online social-networking interactions with other user members of the social-networking community, but not with user members of other social-networking communities. To have social-networking interactions with user members of another social-networking community, the user member must join the other social-networking community and communicate from within the other social-networking community.

For example, the MySpace® social-networking community enables a user member to create a profile, which establishes a MySpace® identity, and to develop online friend relationships with other user members of the MySpace® social-networking community, but not with user members of other social-networking communities, such as the Friendster® and Facebook® social-networking communities, for example. In addition, the MySpace® social-networking community enables user members to share content items within the MySpace® social-networking community only. That is, the MySpace® social-networking community does not enable user members to share their content items with members of other online social-networking communities. If a MySpace® user member wishes to share a content item with a Friendster® user member, the MySpace® user member must join the Friendster® social-networking community, create a profile to establish a Friendster® identity, and upload the content item to a website associated with the Friendster® social-networking community.

A conventional social-networking system enables publisher members and user members to upload content items that may be provided in various webpages associated with the social-networking community. However, conventional social-networking systems do not enable publisher members and user members to easily mix certain types of content items that can be displayed on webpages associated with the social-networking community. Accordingly, methods and systems for enabling publisher members and user members of social-networking communities to easily and conveniently share content items of mixed types are needed to enhance a visitor's enjoyment of webpages associated with the social-networking communities. Increased visitor enjoyment results in increased traffic to webpages of the social-networking communities and to increased membership in the social-networking communities.

Conventional social-networking systems can be created using custom software and commercially available hardware. In addition, commercially available hardware may be used in conjunction with commercially available software that provides social-networking functionality to create a social-networking system. A founder or host of a social-networking community may provide and maintain all of the hardware and software required to host a social-networking system. Alternatively, the founder may outsource development and maintenance of the social-networking system, for example to a commercial Internet Service Provider (ISP). Commercial ISPs typically charge fees for software development and web hosting services. Some commercial ISPs provide web hosting services at no cost or at a reduced cost, if the ISPs are permitted to generate advertising revenues on the hosted webpages. Accordingly, methods and systems are needed for reducing costs associated with operating social-networking communities and increasing revenues generated by social-networking communities.

The present invention overcomes the above limitations associated with conventional social-networking systems.

BRIEF DESCRIPTION OF THE INVENTION

The present invention meets the above-identified needs by providing systems and methods for providing social-networking communities that are inexpensive to operate, that generate increased revenues, and that provide features for enhancing the experiences of user members of these social-networking communities. Various embodiments of the present invention advantageously generate increased revenues for publisher members of social-networking communities, provide an integrated network of interoperating social-networking communities, and provide feeds of multimedia content in a network of social-networking communities.

In accordance with an embodiment of the present invention, there is provided a method for sharing revenues in a network of social-networking communities. The method includes providing a plurality of webpages associated with a social-networking community; determining a first amount based on revenue generated from a first set of the plurality of webpages; paying a first portion of the first amount to a publisher member associated with the social-networking community; and paying a second portion of the first amount to a business unit associated with a core social-networking community of the network.

The method also may include determining a second amount based on revenue generated from a second set of the plurality of webpages; and paying the second amount to the publisher member associated with the social-networking community.

Further, the method may include determining a second amount based on revenue generated from a second set of the plurality of webpages; paying a first portion of the second amount to the publisher member associated with the social-networking community; and paying a second portion of the second amount to the business unit associated with the core social-networking community.

The revenue generated from the first set of the plurality of webpages may include sales revenue. The revenue generated from the first set of the plurality of webpages may be based on a number of requests for one or more webpages of the first set of the plurality of webpages. In addition, the revenue generated from the first set of the plurality of webpages may include advertising and sales revenue. The revenue generated from the first set of the plurality of webpages may be based on a number of requests for one or more webpages of the first set of the plurality of webpages. The method may further include enabling the social-networking communities of the network to utilize an application programming interface and the revenue generated from the first set of the plurality of webpages may be based on a number of calls to the application programming interface.

The method also may include hosting the first set of the plurality of webpages from a web-server associated with the core social-networking community; and hosting a second set of the plurality of webpages from a web-server associated with the social-networking community. The first set of webpages may include a plurality of widgets.

In addition, the method may further include hosting the plurality of webpages from a web-server associated with the core social-networking community. The plurality of webpages may include at least one of: a landing webpage for the social-networking community, a webpage for video categories, a webpage for video-search results, a webpage for photo categories, a webpage for photo-search results, a webpage for searching or browsing user members of the network of social-networking communities, a webpage for a discussion board, a webpage for joining or signing into the social-networking community, a webpage for details associated with a content item displayed from the social-networking community, and a webpage for details associated with a content feed.

In accordance with another embodiment of the present invention, there is provided a computer system including a processor and a memory storing control logic for causing the processor to share revenues in a network of social-networking communities. The control logic includes first computer-readable program code for causing the processor to provide a plurality of webpages associated with a social-networking community; second computer-readable program code for causing the processor to determine a first amount based on revenue generated from a first set of the plurality of webpages; third computer-readable program code for causing the processor to pay a first portion of the first amount to a publisher member associated with the social-networking community; and fourth computer-readable program code for causing the processor to pay a second portion of the first amount to a business unit associated with a core social-networking community of the network.

In accordance with another embodiment of the present invention, there is provided a method of providing a disaggregated social network. The method includes generating a plurality of core user member identifiers respectively corresponding to a plurality of user members; generating a plurality of community identifiers respectively corresponding to a plurality of social-networking communities; and storing a plurality of core profiles respectively corresponding to the plurality of core user member identifiers, wherein each of the plurality of core profiles includes community information, friend information, and content information, wherein the community information includes one or more of the plurality of community identifiers, wherein the friend information includes one or more of the plurality of core user member identifiers, and wherein the content information includes respective metadata associated with each of a plurality of content items.

The method also may include storing a plurality of messages in correspondence with a core user member identifier, wherein a first message of the plurality of messages includes a first sender identifier of a first user member of a first social-networking community of the network, and wherein a second message of the plurality of messages includes a second sender identifier of a second user member of a second social-networking community of the network, the second social-networking community being different than the first social-networking community.

Further, the friend information of at least one of the plurality of core profiles may include a first community identifier and a second community identifier different from the first community identifier. The metadata associated with each of the plurality of content items may include a permission indicating whether the content item can be added to content information of core profiles corresponding to other core user member identifiers.

In another embodiment, the community information of the plurality of core profiles includes two or more of the plurality of community identifiers.

The method may further include receiving a request to add community information to a core profile, the request including a core member identifier and a community identifier; updating community information of a core profile corresponding to the core user member identifier to include the community identifier; and storing updated community information of the core profile corresponding to the core user member identifier.

The method may further include receiving a request for community information, the request including a core member identifier; retrieving community information of a core profile corresponding to the core user member identifier; and providing one or more of the plurality of community identifiers of the community information of the core profile corresponding to the core user member identifier.

The method also may include providing a webpage including one or more of the plurality of community identifiers of the community information of the core profile corresponding to the core user member identifier. The webpage may include one or more of: one or more visual icons respectively corresponding to the one or more of the plurality of community identifiers included in the community information of the core profile corresponding to the core user member identifier, and one or more links to one or more community landing webpages respectively corresponding to the one or more of the plurality of community identifiers included in the community information of the core profile corresponding to the core user member identifier.

In addition, the method may include receiving a core user member identifier; retrieving content information of a core user profile corresponding to the core user member identifier; retrieving friend information of the core user profile corresponding to the core user member identifier; retrieving content information of one or more core user profiles corresponding to one or more of the plurality of core user member identifiers included in the friend information of the core user profile corresponding to the core user member identifier; and outputting the content information of the core user profile corresponding to the core user member identifier and the content information of the one or more core user profiles corresponding to the one or more of the plurality of core user member identifiers included in the friend information of the core user profile corresponding to the core user member identifier.

The method may further include providing a shared content item; and providing a plurality of webpages respectively corresponding to a plurality of community identifiers, wherein each of the plurality of webpages includes the shared content item.

The method also may include receiving a plurality of votes associated with a content item, wherein the plurality of votes are received ftom two or more of: a registered user member of a first social-networking community, a registered user member of a second social-networking community different from the first social-networking community, and an unregistered visitor to a webpage of a third social-networking community; determining a sum of the plurality of votes; and updating metadata associated with the content item to include the sum of the plurality of votes.

The method may further include providing software tools to perform one or more tasks, the one or more tasks including one or more of: creating of a website corresponding to one of the plurality of social-networking communities, adding information to an existing member webpage, deleting information from an existing member webpage, modifying information in an existing member webpage, controlling whether information discovered from an external website may be experienced on an existing member webpage, and adding one or more subscriber functions to an existing member webpage.

The one or more subscriber functions may include one or more of: functions to search for text content, audio content, video content, photographic content, and feed content within the member website or within another member website, a function to search for a subscriber profile of a subscriber to the member website or of a subscriber to another member website, a function to enable a discussion between subscribers to the member website, a function to moderate a discussion between subscribers to the member website, functions to organize information, video categories, audio categories, photographic categories, and feed categories presented on the member website, a function to enable a visitor to become a subscriber to the member website, a function to enable a subscriber to the member website to create or modify a subscriber profile corresponding to the subscriber, a function to enable a subscriber to the member website to browse subscriber profiles of other subscribers to the member website, a function to enable a subscriber to the member website to designate one or more friends on a subscriber profile corresponding to the subscriber, a function to enable a subscriber to the member website to add content to the member website, such that the content may be experienced by another subscriber to the member website, a function to enable messages to be sent between subscribers to the member website, a function to enable messages to be sent between a subscriber to the member website and a subscriber to another member website, and a function to enable a subscriber to the member website to experience content from the member website, the content including any combination of: text content, video content, audio content, photographic content, and feed content.

The method may further include receiving an authorization request, the authorization request including core user member information; retrieving a core user member identifier corresponding to the core user member information; and providing an authentication cookie, wherein the authentication cookie includes the core user member identifier.

The method may include storing one or more community specific display names respectively corresponding to one or more of the plurality of community identifiers included in community information of a core profile corresponding to a core user member identifier.

The method also may include storing a plurality of community profiles respectively corresponding to the plurality of community identifiers, wherein each of the plurality of community profiles includes at least one of: a webpage view report, a user activity report, a revenue report, and a most popular content report for one of the plurality of social-networking communities.

In addition, the method may include receiving a request to add content item information to a core profile, the request including a core member identifier and content item information associated with a content item; updating content information of a core profile corresponding to the core user member identifier to include the content item information of the request; and storing updated content information of the core profile corresponding to the core user member identifier.

Further, the method may include determining whether the content item is suitable for being experienced by a class of user members; updating the content information of the core profile corresponding to the core user member identifier to include the content item information of the request, if the content item is determined to be suitable for being experienced by the class of user members; and storing updated content information of the core profile corresponding to the core user member identifier, if the content item is determined to be suitable for being experienced by the class of user members.

The content item information of the request may be excluded from the content information of the core profile corresponding to the core user member identifier, if the content item is determined not to be suitable for being experienced by the class of user members. The content item may be one of: a text content item, a video content item, an audio content item, and a photographic content item.

The method may further include receiving a request to organize content information, the request including a core user member identifier, and an instruction to specify a visual layout associated with at least one of the plurality of content items; updating content information of a core profile corresponding to the core user member identifier based on the request; and storing the updated content information of the core profile corresponding to the core user member identifier based on the request.

The method also may include receiving a request to update content information, the request including a core user member identifier, and an instruction to update metadata associated with at least one of the plurality of content items; updating content information of a core profile corresponding to the core user member identifier based on the request; and storing the updated content information of the core profile corresponding to the core user member identifier based on the request.

The method may further include storing a plurality of community profiles respectively corresponding to the plurality of community identifiers, wherein each of the plurality of community profiles includes content information, wherein the content information includes metadata associated with each of a plurality of content items; receiving a request to add content item information to a community profile, the request including a community identifier and content item information associated with a content item; updating content information of the community profile corresponding to the community identifier to include the content item information; and storing updated content information of the community profile corresponding to the community identifier.

The method also may include determining whether the content item is suitable for being experienced by a class of user members; updating the content information of the community profile corresponding to the community identifier to include the content item information, if the content item is determined to be suitable for being experienced by the class of user members; and storing updated content information of the community profile corresponding to the community identifier, if the content item is determined to be suitable for being experienced by the class of user members.

The content item information may be excluded from the content information of the core profile corresponding to the core user member identifier, if the content item is determined not to be suitable for being experienced by the class of user members.

The method may further include receiving a request to organize content information, the request including a community member identifier, and an instruction to specify a visual layout associated with at least one of the plurality of content items; updating content information of a community profile corresponding to the community identifier based on the request; and storing the updated content information of the community profile corresponding to the community identifier based on the request.

The method also may include receiving a request to organize content information, the request including a community member identifier, and an instruction to update content information associated with at least one content item; updating content information of a community profile corresponding to the community identifier based on the request; and storing the updated content information of the community profile corresponding to the community identifier based on the request.

The community profile corresponding to the community identifier may include a permission indicating whether content information can be organized by user members, and the updating of content information occurs if the permission indicates that content information can be organized by user members. The community profile corresponding to the community identifier may include a permission indicating whether content information can be updated by user members, and the updating of content information occurs if the permission indicates that content information can be updated by user members.

The method may further include enabling a user member logged into a first social-networking community of the network to communicate with another user member of a second social-networking community of the network. Friend information of at least one of the plurality of core profiles may include at least two core user member identifiers, including a first core user member identifier associated with a first community identifier and a second core user member identifier associated with a second community identifier different from the first community identifier.

The method also may include retrieving content information of a core profile corresponding to a core user member identifier, wherein community information of the core profile includes a first community identifier corresponding to a first social-networking community of the network; retrieving a content item corresponding to the content information; providing a webpage including the content item, wherein the webpage is associated with a second social-networking community different than the first social-networking community.

The method also may include storing a plurality of community profiles respectively corresponding to the plurality of community identifiers, wherein each of the plurality of community profiles includes content information, wherein content information of a community profile corresponding to a first community identifier of a first social-networking community of the network includes content item information associated with a content item; retrieving the content item associated with the content item information; providing a webpage including the content item, wherein the webpage is associated with a second social-networking community different than the first social-networking community.

In accordance with another embodiment of the present invention, there is provided a computer system including a processor and a memory storing control logic for causing the processor to provide a disaggregated social network. The control logic includes first computer-readable program code for causing the processor to generate a plurality of core user member identifiers respectively corresponding to a plurality of user members; second computer-readable program code for causing the processor to generate a plurality of community identifiers respectively corresponding to a plurality of social-networking communities; and third computer-readable program code for causing the processor to store a plurality of core profiles respectively corresponding to the plurality of core user member identifiers, wherein each of the plurality of core profiles includes community information, friend information, and content information. The community information includes one or more of the plurality of community identifiers. The friend information includes one or more of the plurality of core user member identifiers. The content information includes respective metadata associated with each of a plurality of content items.

In accordance with yet another embodiment of the present invention, there is provided a method for creating a feed of content items to be shared within a network of social-networking communities. The method includes receiving, at a server, a request to create a feed, the request being received from a registered member of a social-networking community; receiving, at the server, information for representing the feed, wherein the information includes at least one of: a title, a visual icon, a description, and a flag; storing, in a database accessible by the server, the information for representing the feed; receiving, at the server, a plurality of requests to add a content item to the feed, wherein the plurality of requests include any combination of one or more of: a text content item, a video content item, an audio content item, and a photographic content item; storing each content item included in the plurality of requests in the database in association with the feed and in association with the registered member, wherein each content item is useable by the server to produce a desired content for a visitor to the social-networking community to experience; and providing a webpage including a feed representation showing for each content item at least one of: a title, a visual icon, a description, and the flag.

The feed may be a community feed, and the request to create the community feed may be received from a registered publisher member of the social-networking community. The feed may be a user member feed, and the request to create the user member feed may be received from a registered user member of the social-networking community. Further, at least one content item may be a link to an external server that produces desired content for the visitor to experience, a thumbnail image associated with a friend user member, a display name associated with a friend user member, a play list, a photo album, or a music album.

The method may further include storing in the database information for representing a plurality of community feeds corresponding to the social-networking community. The method also may include, for each content item of the feed, storing in the database a flag used to determine whether a visitor belonging to a designated category is allowed to experience the content item. The method may further include, for each content item of the feed, storing in the database a flag used to determine whether registered members are allowed to share the content item.

The method also may include providing a multimedia renderer in the webpage, the multimedia renderer being configured to process a content item of the feed so that a user may experience the content item. Further, the method may include transmitting information from the feed to an external multimedia renderer when a title, a visual icon, or a description of a content item of the feed is selected.

The method may further include updating a content item stored in the database by replacing the content item with an updated version of the content item.

In addition, the method also may include providing a bookmarklet that causes one of the plurality of requests to add a content item to be received at the server.

The webpage may correspond to a community landing webpage of the social-networking community. Further, the webpage may correspond to a community feed webpage of the social-networking community. The webpage may correspond to a user member profile webpage of the registered user member of the social-networking community.

The method also may include receiving a request to organize a content item of the feed, the request including an instruction to delete the content item or an instruction to specify a visual layout associated with the content item; updating the feed based on the request; and storing the updated feed.

In accordance with still another embodiment of the present invention, there is provided a computer system including a processor and a memory storing control logic for causing the processor to create a feed of content items to be shared within a network of social-networking communities. The control logic includes first computer-readable program code for causing the processor to receive, at a server, a request to create a feed, the request being received from a registered member of a social-networking community; second computer-readable program code for causing the processor to receive, at the server, information for representing the feed, wherein the information includes at least one of: a title, a visual icon, a description, and a flag; third computer-readable program code for causing the processor to store, in a database accessible by the server, the information for representing the feed; fourth computer-readable program code for causing the processor to receive, at the server, a plurality of requests to add a content item to the feed, wherein the plurality of requests include any combination of one or more of: a text content item, a video content item, an audio content item, and a photographic content item; fifth computer-readable program code for causing the processor to store each content item included in the plurality of requests in the database in association with the feed and in association with the registered member, wherein each content item is useable by the server to produce a desired content for a visitor to the social-networking community to experience; and sixth computer-readable program code for causing the processor to provide a webpage including a feed representation showing for each content item at least one of: a title, a visual icon, a description, and the flag.

BRIEF DESCRIPTION OF THE DRAWINGS

The features and advantages of the present invention will become more apparent from the detailed description set forth below when considered in conjunction with the drawings, in which like reference numbers indicate identical or functionally similar elements.

FIGS. 2A and 2B are meant to be joined into a single figure that shows an example of a user profile with a number of Feeds therein.

FIGS. 6A and 6B are meant to be joined into a single figure that shows an example of a Feed Detail webpage with site-specific CSS applied.

FIGS. 7A, 7B, and 7C respectively show portions of an example of an Add to Feed webpage.

FIGS. 8A and 8B are meant to be joined into a single figure that shows an example of a Manage Content webpage.

DETAILED DESCRIPTION

I. Overview

The present invention is directed to systems and methods for providing social-networking communities that are inexpensive to operate, that generate increased revenues, and that provide features for enhancing the experiences of user members of the social-networking communities.

II. System Overview

The present invention is described in terms of an exemplary system in which an exemplary embodiment of the present invention is implemented. This is for illustrative purposes only and is not intended to limit the scope of the application of the present invention to the described example only. It will be apparent to one skilled in the relevant art(s) in view of this description how to implement the present invention in alternative embodiments.

Figure 1:
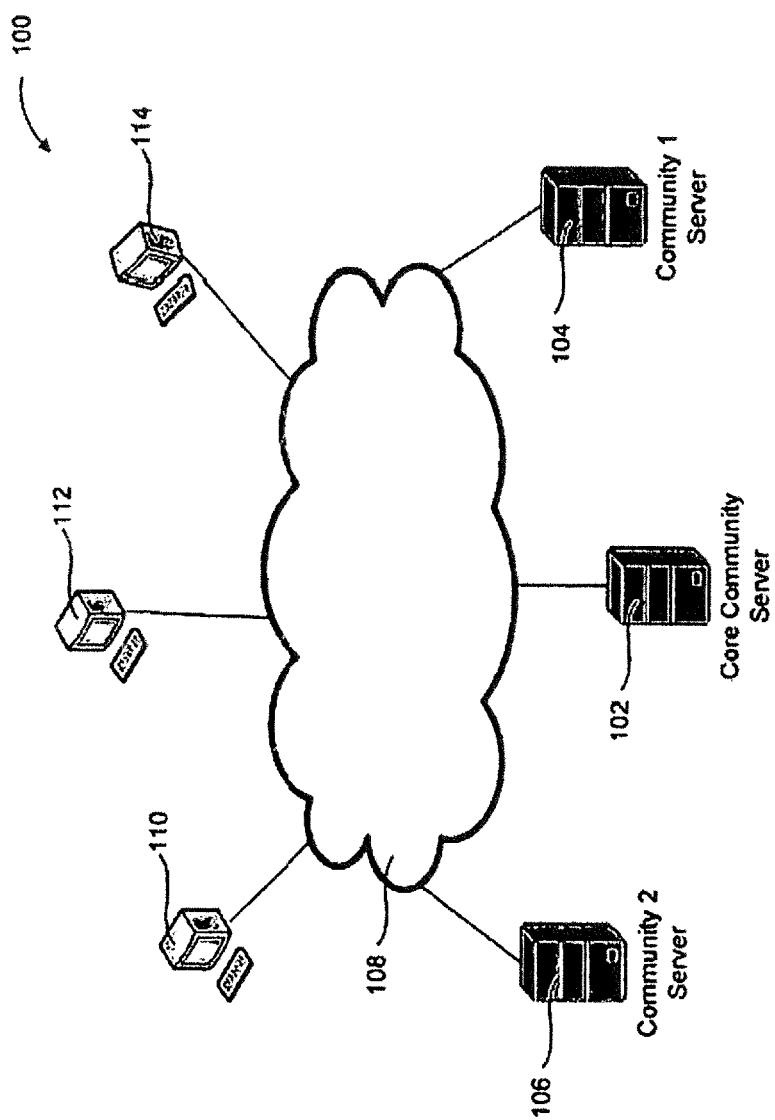
FIG. 1 schematically illustrates a network of social-networking systems according to an exemplary embodiment of the present invention.

FIG. 1 illustrates a network of social-networking systems 100 that includes a core server 102 of a core social-networking community, a first server 104 of a first social-networking community, and a second server 106 of a second social-networking community. The core server 102 of the core social-networking community, the first server 104 of the first social-networking community, and the second server 106 of the second social-networking community are interconnected via a communications network 108. The communications network 108 may be any suitable network capable of transferring data among the core server 102 of the core social-networking community, the first server 104 of the first social-networking community, and the second server 106. For example, the communications network 108 may include the Internet.

The network of social-networking systems 100 also includes computers 110-114, each of which is connected to the communications network 108. The computers 110-114 execute web browsing software that allows users of the computers 110-114 to view and navigate through webpages of websites.

III. Processes

A. Business Processes

The core server 102 provides social-networking functionality associated with a core social-networking community. The following examples illustrate exemplary ways in which the core server 102 may enable social-networking functionality within the network of social-networking systems 100.

First Example—API Integration

In this example, the first server 104 hosts all webpages of a first social-networking community. The first server 104 makes Applications Programming Interface (API) calls to the core server 102. The first server 104 makes a call to the API hosted by the core server 102 when the first server 104 requires information for performing social-networking functions. For example, the first server 104 may provide an identifier corresponding to a user member of the first social-networking community and request information regarding user members who have established an online friend relationship with the user member. The API may return to the first server 104 thumbnail pictures, display names, community information, and content items that are associated with friend user members. In this example, the core server 102 keeps track of each such call to the API, and generates a request for payment from a publisher member of the first social-networking community. The amount of the payment is based on the number of times the API has been called from the first server 104 of the first social-networking community.

Second Example—Community Webpages Partially Hosted by the Core Server

For purposes of this example, assume that the core server 102 hosts a first set of webpages of a second social-networking community, and that the second server 106 hosts a second set of webpages of the second social-networking community. In this example, a publisher member of the core social-networking community is permitted to generate advertising and/or sales revenues via the first set of webpages. A publisher member of the second social-networking community is permitted to generate advertising and/or sales revenues via the second set of webpages. Alternatively, the publisher member of the second social-networking community may permit the publisher member of the core social-networking community to generate advertising and/or sales revenues via the second set of webpages.

For example, the first set of webpages may enable visitors to purchase items of interest to members of the second social-networking community. Accordingly, sales revenue may be generated from the first set of webpages. Since these webpages are provided by the core server 102, the core social-networking community is entitled to a portion of revenues generated from sales originated from the first set of webpages. If there is an agreement between the publisher member of the core social-networking community and the publisher member of the second social-networking community requires that all such revenues be shared, any sales revenue generated from the first set of webpages is shared between a publisher member of the second social-networking community and the core social-networking community.

In addition, the first set of webpages hosted by the core server 102 may include advertisements for products or services offered by an advertiser. For example, if the second social-networking community has user members who are surfing enthusiasts, a distributor of surfboards may pay money to the core social-networking community to have the distributor's surfboard advertisements included in the first set of webpages. The amount of the money could be based on a cost per thousands of webpage impressions, which is often referred to as CPM (M being the Roman numeral corresponding to one-thousand). For example, a webpage that is requested and provided one thousand times may entitle the core social-networking community to receive payment of one U.S. dollar.

Alternatively, the surfboard advertisements in the first set of webpages may include a link to a website of the surfboard distributor. The surfboard distributor pays the core social-networking community an amount of money each time a user member activates the link to the surfboard distributor's website from the first set of webpages. This form of online advertising is often referred to as cost per action or CPA.

Regardless of whether the revenues generated from the first set of webpages are advertising revenues or sales revenues, these revenues are shared between the core social-networking community and the publisher member of the second social-networking community. By default, the revenues are split equally, however, other revenue sharing arrangements may be made.

In addition, the core social-networking community may generate revenues from the second set of webpages hosted by the second server 106. For example, the core social-networking community may sell items or advertising via the second set of webpages on behalf of the publisher member of the second social-networking community. As with the first set of webpages, revenues generated from the second set of webpages are shared between the core social-networking community and the publisher member of the second social-networking community. Alternatively, the publisher member of the second social-networking community may sell items or advertising via the second set of webpages and keep all revenues generated.

Third Example—Community Webpages Entirely Hosted by the Core Server

In this example, all webpages of a third social-networking community are hosted from the core server 102. Similar to the Second Example above, members of the core social-networking community may sell items or advertising via the webpages of the third social-networking community and, thus, generate sales and advertising revenues from the webpages of the third social-networking community. All revenues generated are split or shared between a publisher member of the third social-networking community and the core social-networking community. Revenue sharing advantageously provides a motivation for publisher members of social-networking communities to join the core social-networking community.

B. Disaggregated Social Network

The core server 102 shown in FIG. 1 enables user members and content items of a plurality of social-networking communities to be integrated into a network of social-networking communities. The core server 102 stores information associated with a plurality of user and publisher members, such as profile information for users and communities, and information regarding content items, as will be described below.

A visitor who is not currently affiliated with the network of social-networking communities 100, and who would like to join the first social-networking community of the network of social-networking communities 100 visits a webpage associated with the first social-networking community and follows a link that enables the user member to create a core profile that is stored on the core server 102. The visitor enters authentication information, for example, an external email address of the visitor and a password. The authentication information is stored by the core server 102, and a core profile corresponding to the visitor is created. The visitor has now become a user member of the core social-networking community.

The core profile created by the core server 102 includes a core user member identifier, for example a string of alphanumeric characters that uniquely identifies the user member within the network of social-networking communities 100, Once authenticated, the core server 102 may provide the core user member identifier to a website associated with one of the social-networking communities of the network 100. For example, the core server 102 may send a cookie to the first server 104 that includes the core user member identifier.

The core server 102 also enables the user member to enter personal information, which is stored in the core profile corresponding to the user member. For example, the user member is enabled to enter information regarding birth date, gender, location, and a brief description of interests.

The core profile corresponding to the user member also includes community information, which includes at least one community identifier, for example, a string of alphanumeric characters that uniquely identify a social-networking community in the network of social-networking communities 100. After joining the core social-networking community, the user member is enabled to join the other social-networking communities of the network 100, such as the first social-networking community, for example.

When the user member visits a website of the first social-networking community in the network of social-networking communities 100, the user is presented with a link that enables the user member to join the first social-networking community. Prior to joining the first social-networking community, the user member may be required to acknowledge terms and conditions of use of the first social-networking community, for example, by checking a box indicating that the user agrees to those terms of use, and selecting an icon to submit the request to join the first social-networking community. After acknowledging the terms and conditions of use of the first social-networking community, a community identifier corresponding to the first social-networking community is added to the community information of the core profile corresponding to the user member.

After joining the first social-networking community, a server of the first social-networking community may request information from the core server 102 regarding social-networking communities of the network 100 that the user member has joined so that this information can be included in a webpage. For example, the first server 104 may provide the user member's core user member identifier to the core server 102 and request community information for the user member. The core server 102 responds by retrieving community information from the core profile corresponding to the core user member identifier and provides this information to the first server 104.

The community information may include community identifiers corresponding to the first and second social-networking communities, in addition to textual descriptions, thumbnail images, and links associated with the first and second social-networking communities, respectfully. The first server 104 may respond by populating a portion of a webpage with the community information returned from the core server 102. The server 106 may generate a Profile webpage with a Communities section that includes the textual descriptions, thumbnail images, and links associated with the first and second social-networking communities.

Figure 2A:
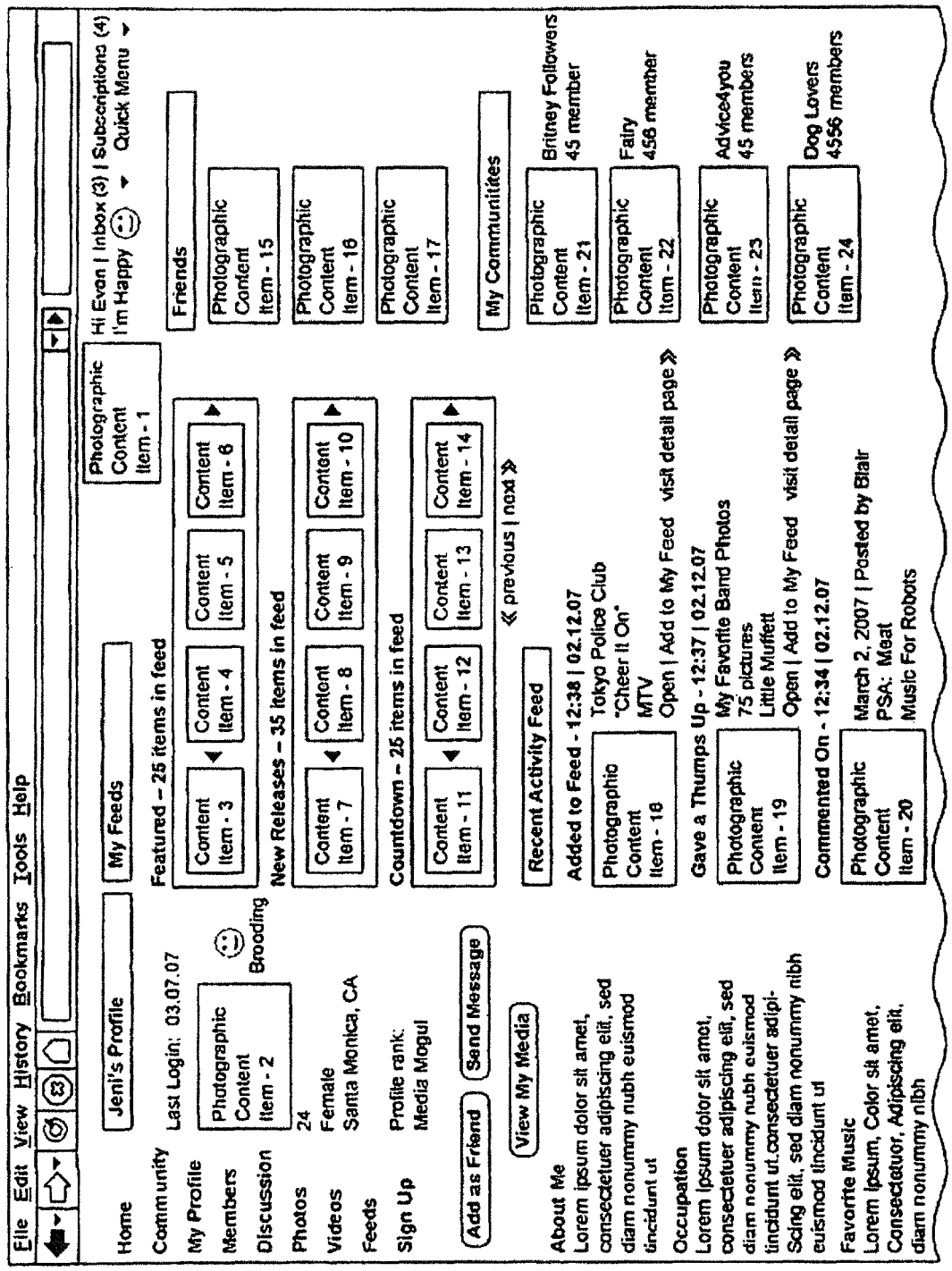

For example, referring to FIGS. 2A and 2B, a webpage including user Jeni's Profile includes a My Communities section that includes a thumbnail image, a textual description, and a link to each of a plurality of social-networking communities, e.g., a Britney Followers social-networking community, a Fairy social-networking community, an Advice4you social-networking community, and a Dog Lovers social-networking community. When a visitor to the webpage shown in FIG. 2A selects one of the thumbnail images or textual description, the link to the corresponding social-networking community is activated and a webpage of that social-networking community is displayed.

Each core profile also includes friend information regarding other user members of the network of social-networking communities 100 with whom the corresponding user member has established online friend relationships. A first user member may send a friend request to a second user member of the first social-networking community. If the second user member accepts the friend request, friend information of core profiles corresponding to the first and second user members are updated to reflect this relationship. More particularly, friend information of a core profile corresponding to the first user member is updated to include a core user member identifier corresponding to the second user member, and friend information of a core profile corresponding to the second user member is updated to include a core user member identifier corresponding to the first user member. The friend information also may include a thumbnail image, a link, and a display name corresponding to each core user member identifier included in the friend information.

A server of the network of social-networking communities 100 may request friend information for a user member and display information returned by the core server 102 in a webpage. For example, referring to FIG. 2A, a webpage including user Jeni's Profile may include a Friends section that includes thumbnail images of user Jeni's friends. If a visitor viewing this webpage selects one of the thumbnail images, a link to the corresponding thumbnail is activated and a webpage of the corresponding friend user member is displayed.

The friend information of a core profile may include a community identifier for each core user member identifier stored therein. For example, the friend information may include two core user member identifiers corresponding to a user member of the first social-networking community and a user member of the second social-networking community.

In this example, the friend information would include two core user member identifiers and two community identifiers.

It should be noted that the core server 102 provides inter-community messaging capabilities for user members. For example, when the first user member sends the friend request to the second member, the first user member may be logged into the network of social-networking communities and visiting a webpage of the first social-networking community and the second user member may be logged into the network of social-networking communities and visiting a webpage of the second social-networking community. The inter-community messaging capabilities provided by the core server 102 enable the second user to respond to the friend request by accepting or declining the friend request from a webpage of the second social-networking community. The friend requests are stored as message information in core profiles corresponding to the first and second core user member identifiers. The message information also may include community identifiers, thumbnail images, and textual descriptions associated with the social-networking communities of the network from which the friend request messages originated.

Similarly, the first and second user members can exchange email messages, even when they are visiting webpages of different social-networking communities of the network. The email messages are stored as message information in core profiles corresponding to the first and second core user member identifiers. The message information also may include community identifiers, thumbnail images, and textual descriptions associated with the social-networking communities of the network from which the email messages originated. This message information may be provided to servers of the network of social-networking communities, which provide webpages including this information. Using this information, a user member can identify which social-networking community in the network a user was visiting when an email message was generated.

A publisher member of a social-networking community is enabled to add content items to webpages that are associated with the social-networking community. In addition, a user member of a social-networking community is enabled to add content items to webpages that are associated with the user member. Content items may include, but are not limited to, a text item, a video item, an audio item, and a photographic item. Text items include a website posting, a blog entry, a discussion group entry, a comment regarding another content item, a hyperlink to a content item, and other items containing text. Video items include a Moving Picture Experts Group (MPEG) file, a Windows® Media Video (WMV) file, a Flash® file, a Quicktime® file, and other files formatted for digitally storing video data. Audio items include an MPEG-1 Audio Layer 3 (MP3) file, a WAVEform file, and other files formatted for digitally storing audio data. Photographic items include a Joint Photographic Experts Group (JPEG) file, a Tagged Image File Format (TIFF) file, and other files formatted for digitally storing photographic data.

Core profiles also may include content information that includes metadata associated with content items. For example, a user member may be authenticated by the core server 102 and the user member may visit a webpage of the first social-networking community of the network 100. The user member may choose to upload a picture, a video, or other content item to a server of the first social-networking community. The first server 104 of the first social-networking community enables the user member to select the content item for uploading. For example, the first server 104 may enable the user member to supply a local path to the content item on the user member's computer. The server of the first social-networking community also enables the user member to supply a textual description of the content item. The first server 104 transmits this information to the core server 102, where it is processed and stored.

For example, if the user member uploads a picture to the first server 104 and supplies a textual description of "Me on my hike," the first server 104 provides the core server 102 with the user member's core user member identifier, the textual description, a thumbnail version of the picture, and a link to picture on the first server 104. The core server 102 responds by updating content information of the core profile corresponding to the user member's core user member identifier to include the textual description, the thumbnail image, and the link to the picture on server 104.

The first server 104 may provide a webpage that includes a profile for the first user member. The first server 104 may send a request to the core server 102 for content information, the request includes the first member's core user member identifier. The core server 102 responds by retrieving the content information of the core profile corresponding to the first user member's core user member identifier, and providing same to the first server 104. The first server 104 includes the content information in the profile webpage for the first user member.

When user members of or visitors to the network of social-networking communities 100 view the profile webpage, they will see a thumbnail image of the picture, the textual description, and the link to the content item on the first server 104, which, when activated, results in the full photograph being displayed in a media renderer included in the profile webpage. The profile webpage also may include a display name of the first user member and an associated icon, which identify the first user member as having provided the content item to the network of social-networking communities 100.

In addition, the profile webpage of a user member also may include content items of other user members who have established an online friend relationship with the first user member via the core server 102. In this case, when the first server 104 sends a request for content information that includes the user member's core user member identifier, the core server 102 responds by retrieving the content information from the core profile corresponding to the first user member, as described above. In addition, the core server 102 retrieves core user member identifiers from the friend information of the core profile corresponding to the user member, and retrieves content information from respective core profiles corresponding to the core user member identifiers included in the friend information. The content information of the user member's friends are provided by the core server 102 to the first server 104. The first server 104 responds by providing a profile webpage with the content information of the user member and the user member's friends.

It is noted that the user member's friends may be members of multiple social-networking communities of the network 100. For example, the profile webpage provided by the first server 104 may be associated with a first social-networking community. The user member's friends may be associated with a second social-networking community. Accordingly, the profile webpage of the first social-networking community may include content items of user members of the second social-networking community.

When a user member activates a link to a content item of the second social-networking community, the content item is displayed in the profile webpage of the first social-networking community, and the core server 102 keeps track of a number of views associated with the content item. Accordingly, the user member is not redirected to a website of the second social-networking community. However, the number of views associated with the content item of the second social-networking community is updated to give proper credit for the number of views of this content item. This is one example of tracking of user actions and content items performed by the core server 102.

It is further noted that the user member of the second social-networking community may set a permission, which is stored in associated content information, that indicates whether a content item may be shared across social-networking communities of the network. If such a permission indicates that a content item is not to be shared across social-networking communities of the network, the core server 102 excludes associated content information from the content information that is returned to the first server 104.

Voting is another example of tracking of user actions and content items that is performed by the core server 102. For example, a selectable voting icon may be included in a webpage that includes a content item. If the voting button is selected by a user member, the server providing the webpage sends tracking information to the core server 102. For example, the first server 104 may send to the core server 102 a message including the core user member identifier of the user member who is voting, and content information of the content item. The content information may include a core user member identifier of a user member who added the content item to the network of social-networking communities 100 and a community identifier associated with the social-networking community webpage from which the vote was provided. The core server 102 responds by updating the content information of a core profile corresponding to the core user member identifier of the user member who added the content item to the network.

For example, the core server 102 updates this content information to increase the number of votes associated with the content item, and also stores the core user member identifier of the user member who voted and the community identifier of the social-networking community from which the vote was provided. The core server 102 may generate reporting information regarding content items that include a total number of views in the network of social-networking communities 100, in addition to a total number of votes associated with the content. These reports also may include a breakdown of such votes and views for each social-networking community of the network of social-networking communities 100.

In this way, a content owner can determine from which social-networking communities the content item has been viewed. In addition, the content owner can determine a number of votes for the content item from each of the social-networking communities of the network. The core server 102 also generates tracking information regarding a number of views of and a number of votes for content items made by visitors who are not registered user members of the network of social-networking communities 100.

A publisher member of a social-networking community of the network of social-networking communities also can add content items, which are displayed in webpages of the social-networking community. For example, the publisher member can add an interesting video content item to a community landing webpage in an effort to attract visitors to webpages of the social-networking community and to entice user members to join the social-networking community. The core server 102 stores a community profile for each social-networking community of the network of social-networking communities 100. A community profile includes content information that is similar the content information of the core profiles.

For example, the publisher member may send to the core server 102, via the first server 104, a request to add community content information. The request includes a community identifier of the first social-networking community. The core server 102 responds by updating content information of a community profile corresponding to the first social-networking community to include the content information of the request. The content information of the request may include a textual description of the content item, a thumbnail image of the content item, a link to the content item on the first server 104, and an indication of whether the content item is permitted to be shared in anther social-networking community of the network of social-networking communities 100.

The core server 102 also stores tracking information for each community content item, similar to the tracking information stored for user content items. The core server 102 uses the tracking information to generate reporting information for community content items. The reporting information may include a total number of views, a total number of votes, and a breakdown of the number of votes and views per social-networking community of the network of social-networking communities 100. As with user content items, the core server 102 also generates reporting information regarding the number of views and votes by visitors who are not members of the network of social-networking communities 100.

The core server 102 also enables moderating of content items. When a user member submits a user content item or a publisher member submits a community content item to the core server 102, the core server 102 retrieves moderation information from an appropriate community profile. The moderation information includes an indication of which class(es) of content items are permitted to be associated with a particular social-networking community. In addition, the moderation information may include an indication of who is permitted perform the content moderation function.

For example, the moderation information may indicate that only content deemed to be appropriate for viewers of any age is permitted to be added to the content information of a community profile or a user profile. Further, the moderation information may indicate that moderating is to be performed by an administrative member of the core social-networking community. In this case, prior to adding the content information to any profiles, the content information is provided to an administrative member of the social-networking community, who determines whether the corresponding content item is appropriate based on a class of viewers permitted to view the content items. If the corresponding content item is determined to be appropriate for viewers of all ages, the content information is added to community information of a community profile. If the corresponding content item is determined to be inappropriate for viewers of all ages, the content information is excluded from the community information of the community profile.

The core server 102 provides a family of widgets or software code that operate in conjunction with software executing on the core server 102. Widgets may include HTML code that can be integrated into HTML code of a webpage. Widgets are configured to include a community identifier of a social-networking community. Widgets use the API to get data and perform actions. Generally, there are two types of widgets: inline and iframe. Inline widgets may include javascript code. Iframe widgets are much simpler and enable almost any control from the websites to be shown within an external website.

A publisher member may request one or more widgets for providing social-networking features on a website of a social-networking community. For example, a publisher member may send to the core server 102, via the first server 104, a request for a widget, wherein the request includes a community identifier of the publisher member's social-networking community. The core server 102 responds by customizing the software code of the widget for use on the first server 104. For example, the core server 102 inserts the community identifier included in the request into the software of the widget, and provides the customized widget to the first server 104. The publisher member inserts the widget code into a webpage of the social-networking community.

Widgets provide an inexpensive and convenient way of expanding social-networking capabilities of an existing website of a social-networking community. For example, the widgets allow webpages that are hosted by the core server 102 on behalf of the publisher member of the social-networking community to be seamlessly integrated with webpages of the social-networking community that are hosted by the first server 104. Webpages hosted by the core server 102 may include any combination of the following types of webpages:

A Community Landing webpage displays community content items of a publisher member's social-networking community. The core server 102 enables a publisher member to configure a widget associated with a Community Landing webpage to configure a visual layout or other display properties of the Community Landing webpage.

A Video Categories webpage displays a variety of categories of video content items. The core server 102 enables a publisher member to configure a widget associated with a Video Categories webpage to configure textual descriptions of categories of video content items that are displayed on the webpage and also to configure the layout of the video content items in the Video categories webpage.

A Video Search webpage enables search criteria for video content items to be entered and corresponding results to be displayed. The core server 102 enables a publisher member to configure a widget associated with a Video Search webpage to configure a number of results that are displayed on one Video Search webpage and to configure whether the search is performed on video content items associated with other social-networking communities of the network 100.

A Photo Categories webpage displays photographic content items. The core server 102 enables a publisher member to configure a widget associated with a Photo Categories webpage to configure textual descriptions of categories of photographic content items displayed on the Photo Categories webpage and to configure a visual layout or other display properties of those content items.

A Photo Search webpage enables search criteria for photographic content items to be entered and corresponding results to be displayed. The core server 102 enables the publisher member to configure a widget associated with the Photo Search webpage to configure a number of results to display on one webpage and to configure whether the search is performed on photographic content items associated with other social-networking communities of the network 100.

A Browse Members webpage enables browse criteria for user members to be entered and corresponding results to be displayed. The core server 102 enables a publisher member to configure a widget associated with a Browse Members webpage to configure a number of results to be displayed on one Browse Members webpage and to configure whether the search is performed on user members associated with other social-networking communities of the network 100.

A Discussions webpage enables visitors to a website associated with a social-networking community to participate in community discussions. The core server 102 enables a publisher member to configure a widget associated with a Discussions webpage to configure how discussion entries are displayed on the Discussions webpage.

A Sign Up/Sign In webpage enables nonmembers of the core social-networking community to join the core social-networking community. A Sign Up/Sign In webpage also enables members of the core social-networking community to join a social-networking community associated with a particular Sign Up/Sign In webpage. The core server 102 enables a publisher member to configure a widget associated with a Sign Up/Sign In webpage to configure terms and conditions associated with membership in a social-networking community.

A Content Detail webpage displays details associated with community content items. The core server 102 enables a publisher member to configure a widget associated with a Content Detail webpage to configure display properties associated with the Content Detail webpage.

Figure 6A:
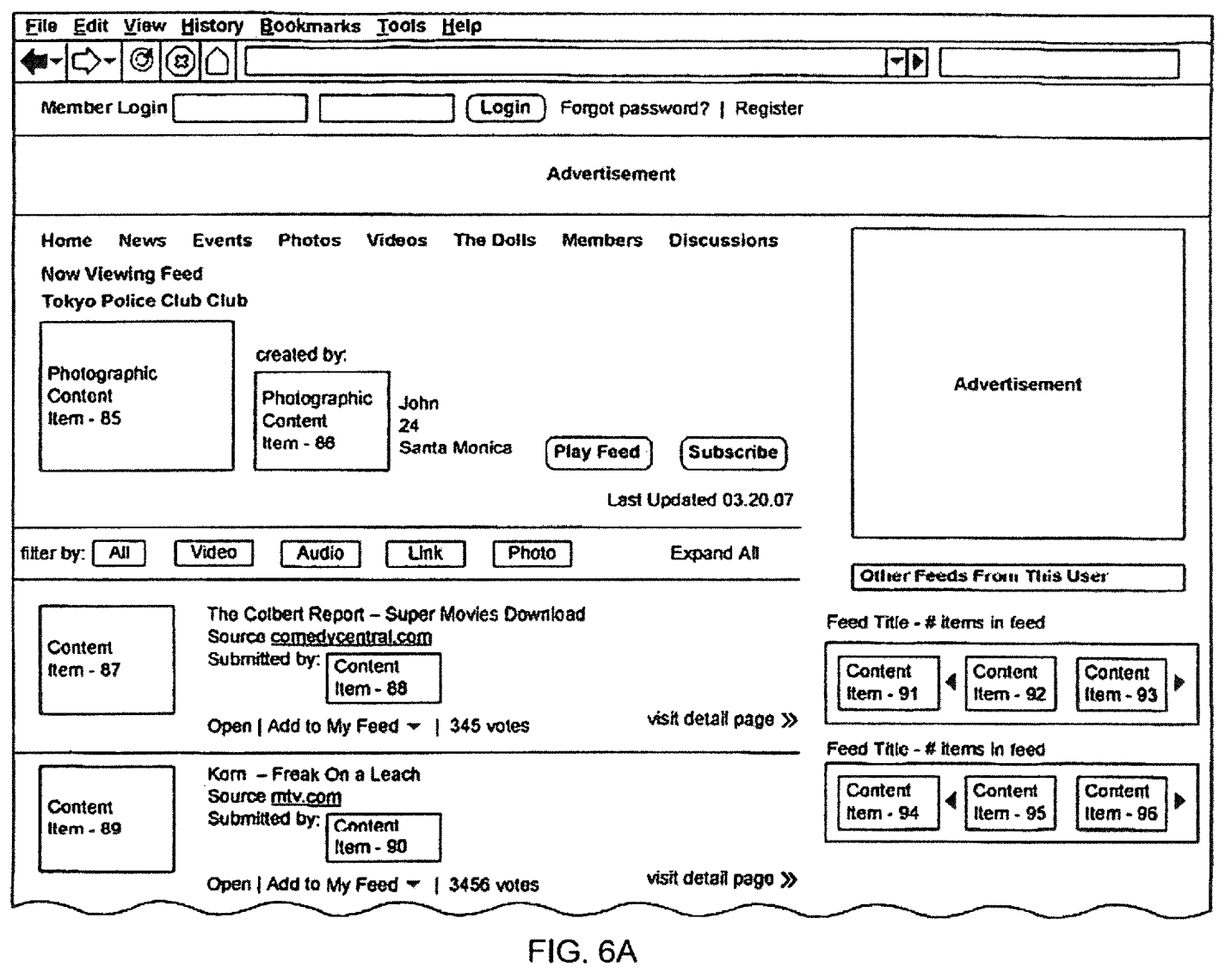
Figure 6B:
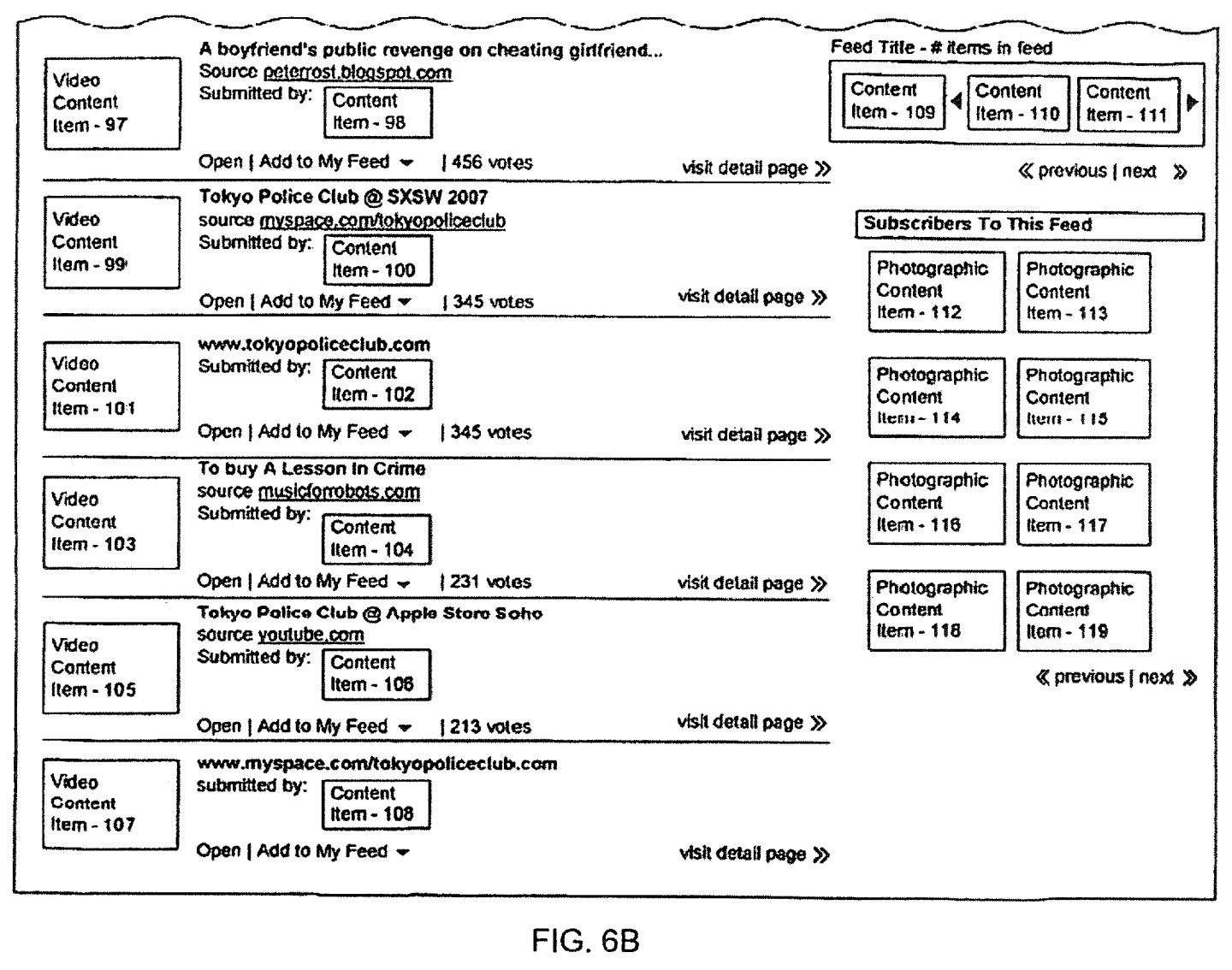

A Feed Detail webpage enables a visitor to a social-networking community to request details associated with a community feed. FIGS. 6A and 6B illustrate an exemplary Feeds Detail webpage. As shown in FIG. 6A, a user is enabled to filter content items of a feed by type, such that only content items of that type are displayed. Types of content items include video content items, audio content items, photographic content items, and text content items, such as links to content items, for example. The core server 102 enables a publisher member to configure a widget associated with a Feed Detail webpage such that display properties of the Feed Detail webpage are displayed.

In addition, webpages that are hosted by the core server 102 may include any combination of the following types of webpages that are associated with user members of the network of social-networking communities 100. A My Profile webpage displays information regarding a user member of the network of social-networking community. A My Media webpage displays information regarding a user member's content items. A My Account webpage displays information regarding a user member's account with the core social-networking community. A My Mail webpage displays a user member's email messages and enables the user member to read email messages, delete email messages, compose email messages, and send email messages to other user members of the network of social-networking communities 100.

The core server 102 enables content items to be shared in a variety of ways within the network of social-networking communities 100. For example, the core server 102 enables a user member of a first social-networking community to post a content item associated with the first social-networking community to a webpage of a second social-networking community. Accordingly, the core server 102 enables a visitor to the webpage of the second social-networking community to experience the content item, which is associated with the first social-networking community.

In addition, the core server 102 enables a first user member of a first social-networking community to email, within the network of social-networking communities 100, a content item that is associated with the first social-networking community to a second user member of a second social-networking community. Thus, the core server 102 enables the second user member to experience the content item, which is associated with the first social-networking community, from a My Mail webpage associated with the second social-networking community.

Further, the core server 102 enables a user member of a first social-networking community to add a content item to the user's core profile. For example, the core server 102 enables the user member to add the content item to the user member's My Media webpage. Accordingly, the core server 102 enables the content item, which is associated with the first social-networking community, to be experienced by user members of other social-networking communities of the network 100.

In addition, the core server 102 enables a user member of a first social-networking community to create a feed of shared content items. The core server 102 also enables user members of other social-networking communities to subscribe to the shared feed. Thus, the core server 102 enables the user members of the other social-networking communities of the network 100 to experience the content items of the feed, which are associated with the first social-networking community.

C. Feed Processes

The core server 102 enables user members and publisher members of the network of social-networking communities to create feeds of content items. The core server 102 stores sharing information for each feed, which indicates whether or not the feed can be shared outside of the social-networking community from which it was created.

Figure 3A:
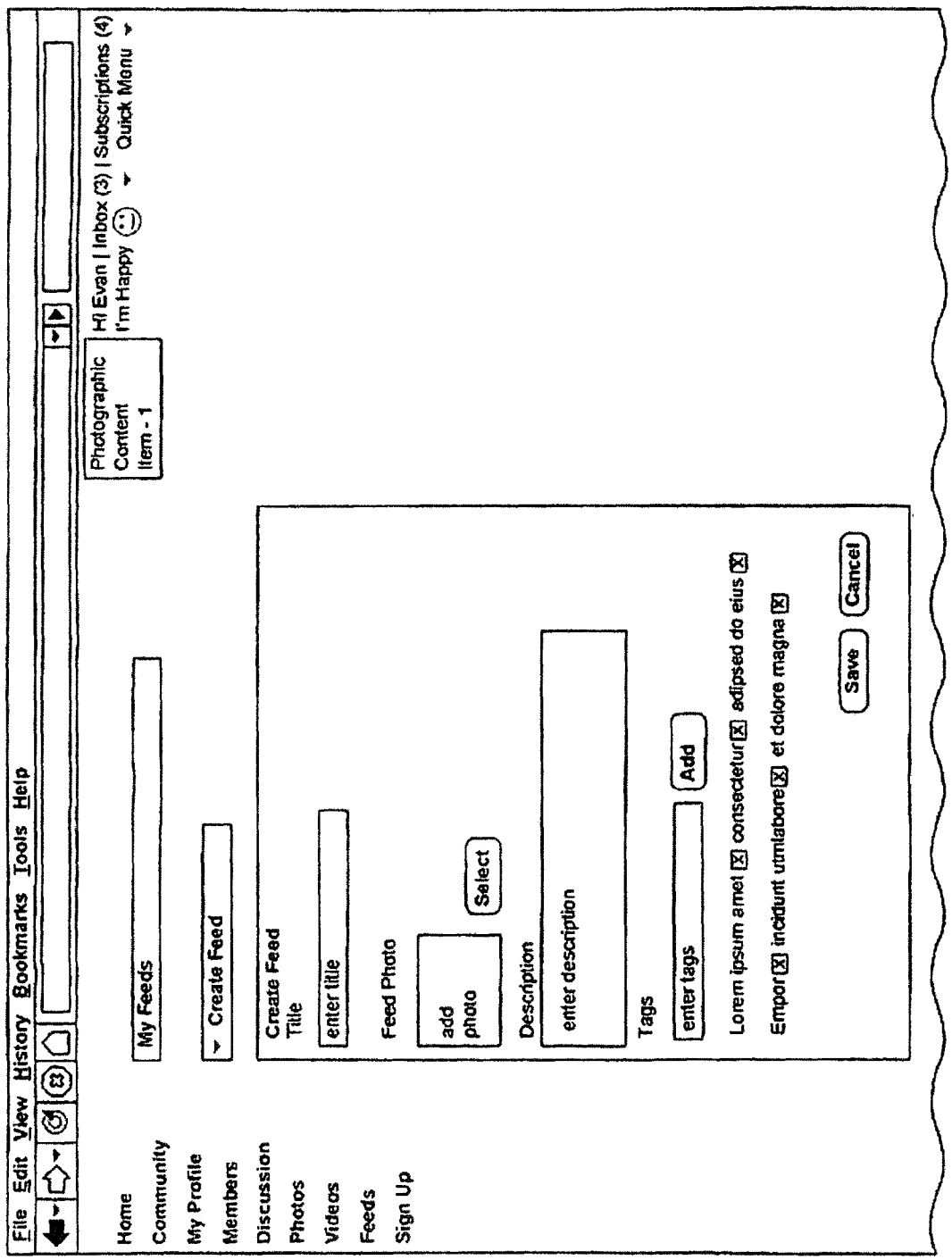
FIGS. 3A and 3B are meant to be joined into a single figure that shows an example of a webpage for creating or editing a Feed.
Figure 3B:
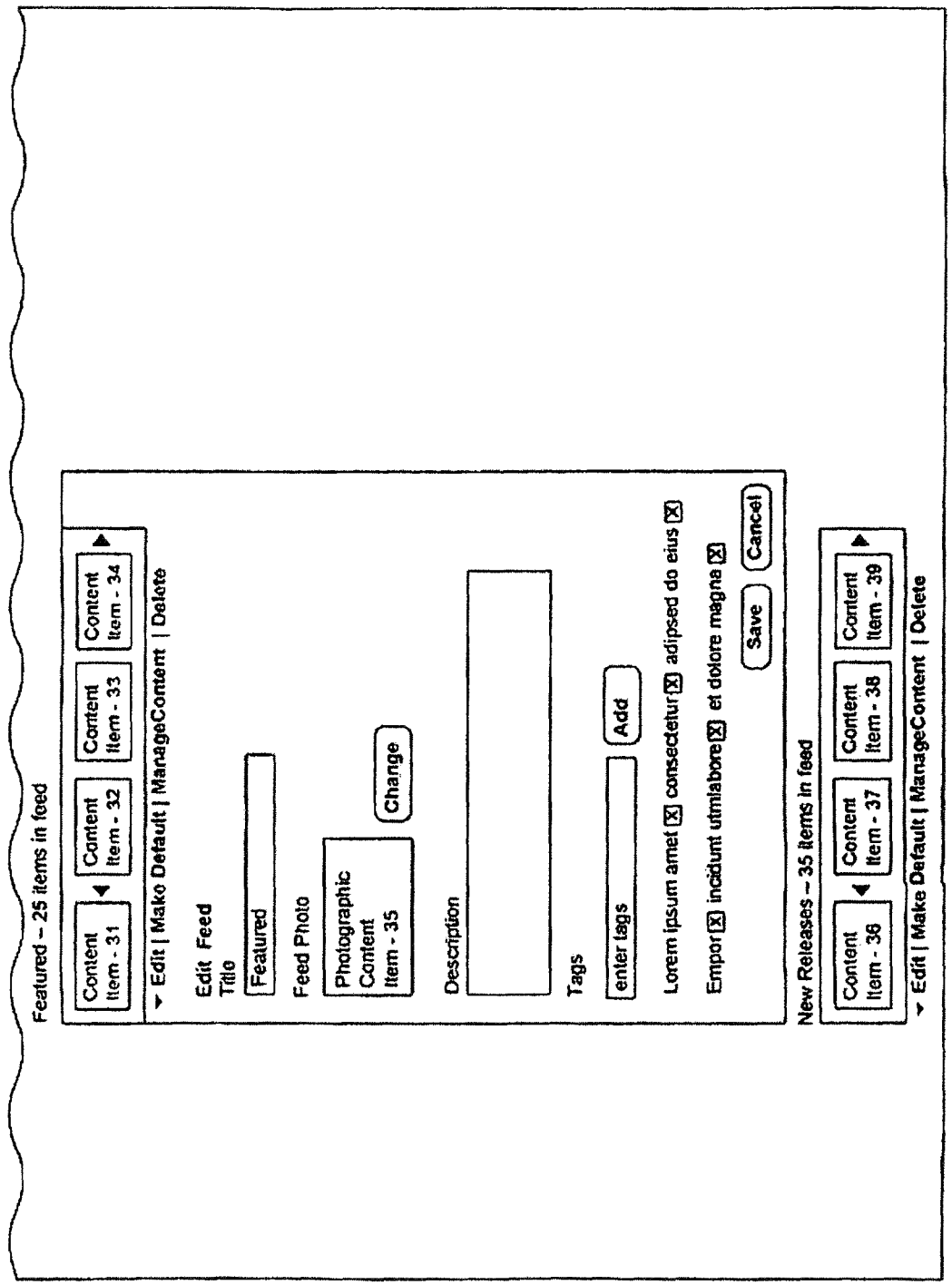

The core server 102 enables a feed creator, i.e., a user member or a publisher member, to send a request to the core server 102 to create a feed. The request to create a feed includes any of the following: a title of the feed to be created, a visual icon to be associated with the feed, a textual description of the feed, a tag, and a flag indicating whether or not the feed is to be treated as a default feed. In response, the core server 102 stores in a database the feed information provided in the request. For example, FIGS. 3A and 3B illustrate an exemplary webpage provided by the first server 104, which enables a user member to send a request to the core server 102 to create a feed.

Figure 7C:
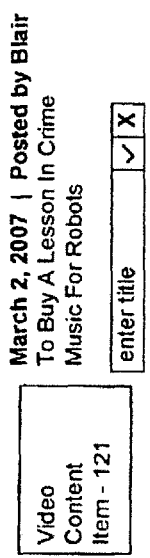

In addition, the core server 102 enables a feed creator to send a plurality of requests to add content items content items to a feed. FIGS. 7A, 7B, and 7C respectively illustrate portions of an exemplary Add To Feeds webpage that enables a feed creator to add content items to a feed. As shown in FIG. 7A, a user member or a publisher member is enabled to select an icon to add an associated content item to a feed. When the member selects the icon, a drop-down menu appears that enables the member to select a feed to which the associated content item is added, as shown in FIG. 7B. The member also is enabled to update content item information associated with a content item of a feed. For example, as shown in FIG. 7C, the member is enabled to enter a title associated with the content item, which will be displayed in the member's feed. The member also is enabled to delete the content item from the member's feed, for example, by selecting the "X" of the portion of the webpage shown in FIG. 7C.

Feeds created by the core server 102 may include any combination of types of content items. For example, a feed may include a link to a content item provided by an external server, a thumbnail image associated with a user friend member, a display name of a user friend member, a link to user member's profile, a play list, photo album, a music album, and the like.

Figure 4:
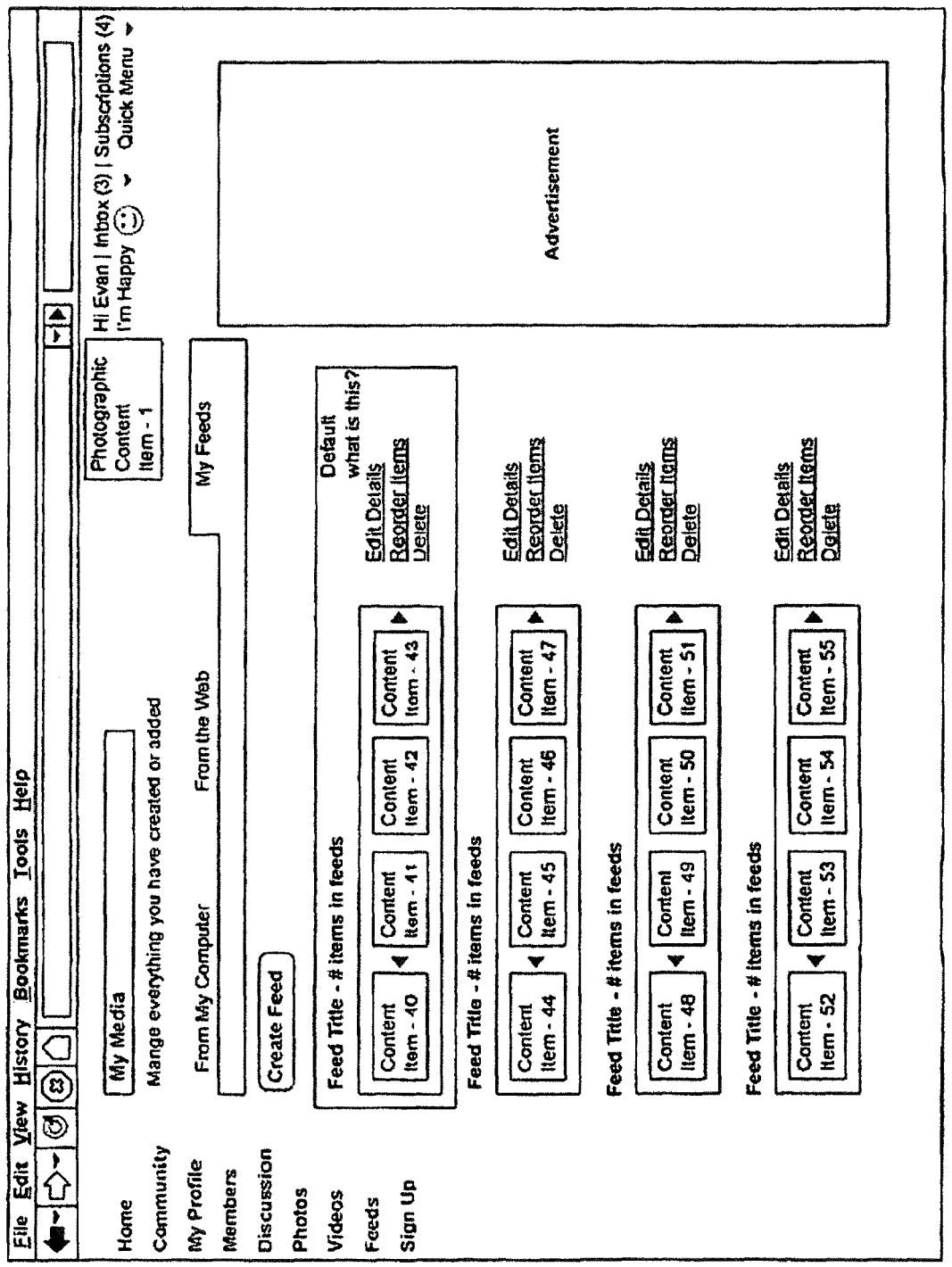
FIG. 4 shows an example of a My Feeds webpage.
Figure 5A:
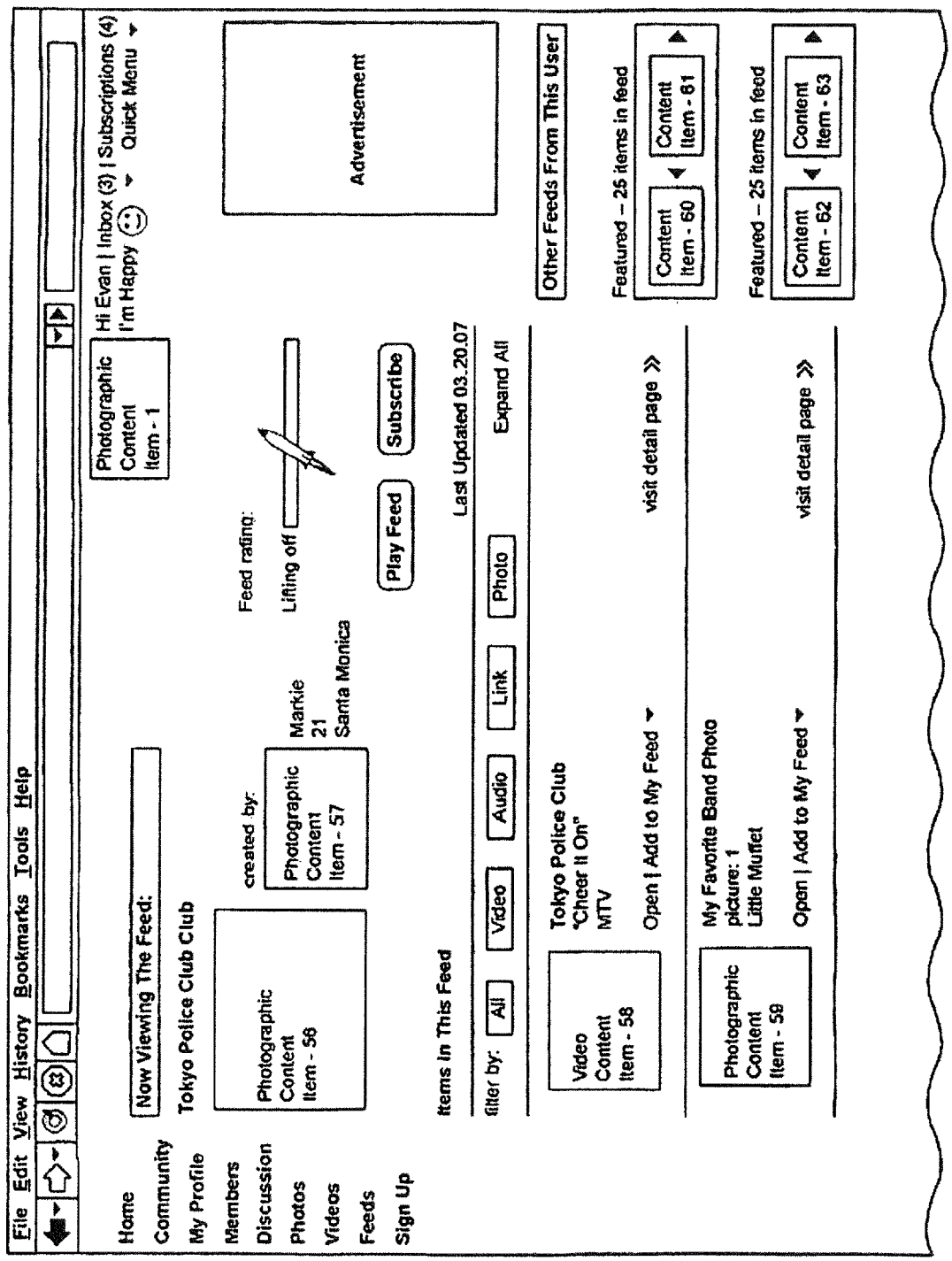
FIGS. 5A and 5B are meant to be joined into a single figure that shows an example of a Feed Detail webpage.
Figure 5B:
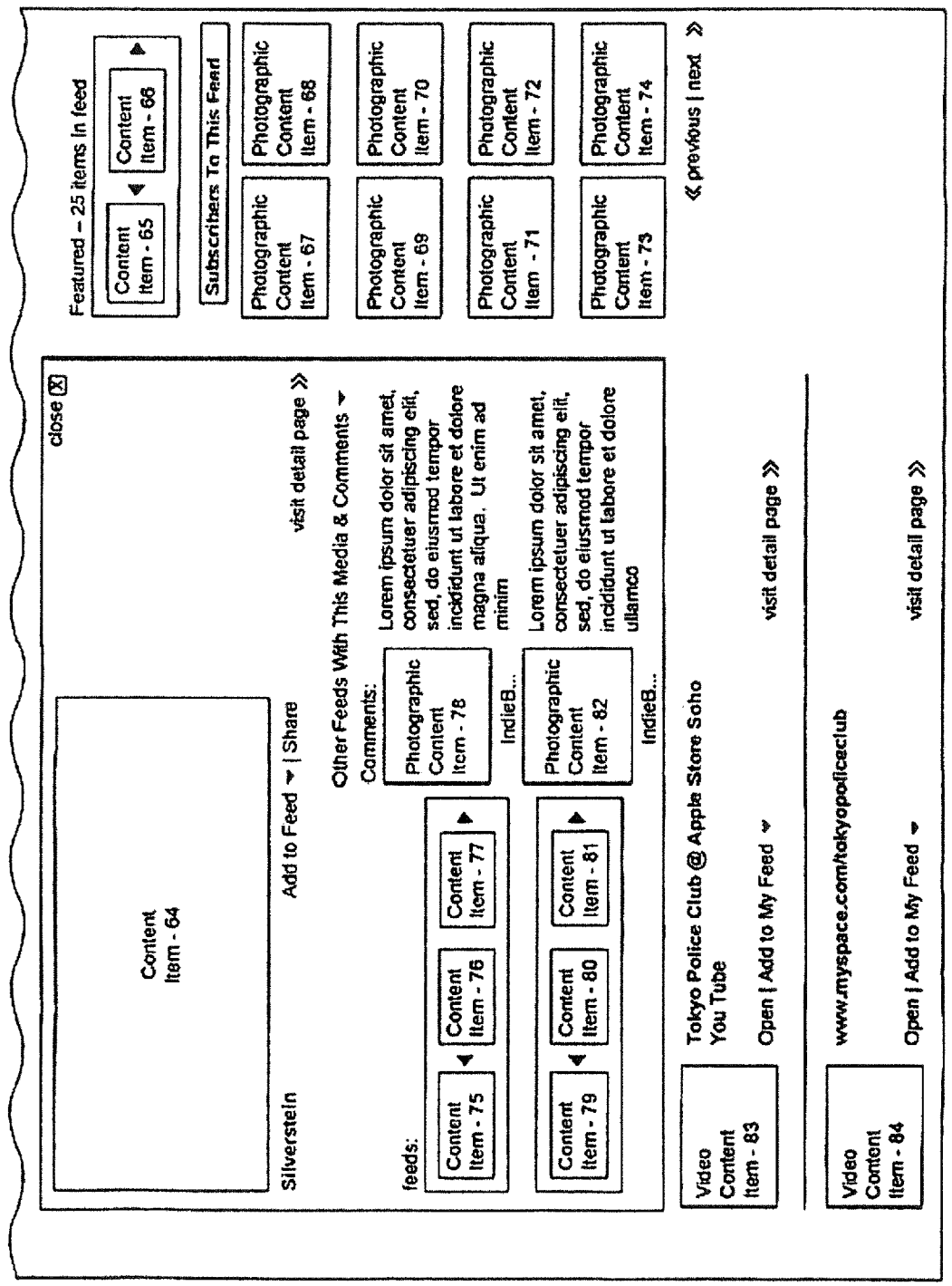
Figure 8B:
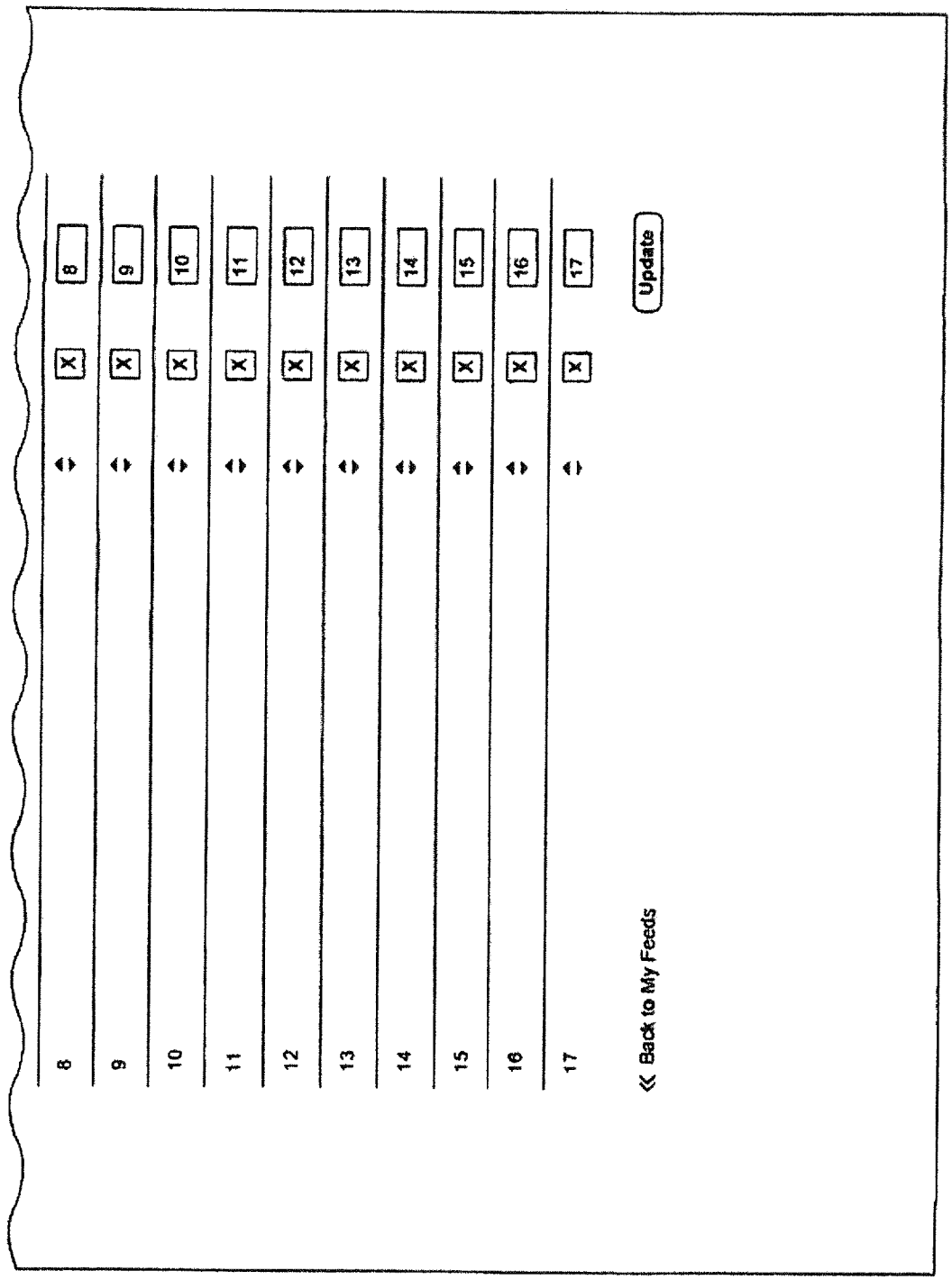

The core server 102 enables the feed creator to organize content items of the feed. FIG. 4 illustrates an exemplary My Media webpage that enables a feed creator to edit details of the feed, to reorder feed content items, and to delete content items from the feed. In addition, FIGS. 8A and 8B illustrate an exemplary webpage that enables a feed creator to reorder and/or delete content items of a feed.

A feed that is created by a user member may be displayed in a webpage of any social-networking community that the user member has joined. For example, a user feed may be displayed in a profile webpage of the user member who created the feed. In addition, other user members may subscribe to a feed, for example, by selecting an icon associated with the feed.

A feed that is created by a publisher member may be displayed in a webpage of the publisher's social-networking community. For example, the community feed may be displayed in a Community Landing webpage or Feeds webpage of a social-networking community. The core server 102 enables the publisher member to set a modification permission that is stored by the core server 102. The modification permission may indicate that user members of the publisher's social-networking community are permitted to add, update, or organize feed items of a community feed. When a user member attempts to perform one of these actions, the core server 102 evaluates the modification permission and responds accordingly. For example, if a modification permission indicates that user members are permitted to add content items to a community feed, the server 102 will enable a user member of the social-networking community to add a content item to the feed. A plurality of feeds of content items may be associated with a social-networking community or a user of a social-networking community.

The core server 102 enables a publisher member to provide restrictions on content items that are permitted to be added to a community feed. For example, a publisher member may provide a restriction to the core server 102 indicating that a content item must be suitable for viewing viewers of all ages. In this example, the content item undergoes a moderation process, similar to the one described above regarding community content items, prior to being added to the community feed.

The core server 102 also may provide one or more renderers for rendering content items of a feed. The core server 102 may provide a multimedia renderer for displaying a multimedia content item, a photographic renderer for displaying a photographic content item, an audio renderer for providing audio of an audio content item, and other renderers for experiencing other types of content items.

For example, a user member may select a link associated with an audio content item, and in response the core server 102 provides a webpage including an audio renderer playing the selected audio content item. Alternatively, the core server 102 may transmit corresponding audio content to an external audio renderer. That is, the core server 102 transmit may corresponding audio content to an audio renderer within a window that is external to a browser window in which the user member is viewing the links to the content items of the feed.

The core server 102 uses links to content items to obtain copies of the content items of the feed, which are stored in a database. The core server 102 may periodically determine whether a content item of a feed has changed by comparing a current version of the content item with the copy of the content item stored in the database. If the core server 102 determines that a particular content item has changed, the core server 102 may download an updated version of the content item and store it in the database in place of the older version of the content item.

The core server 102 also may provide a bookmarklet to a publisher member or user member when the member joins the network of social-networking communities 100. The member can select the bookmarklet from within a web browser, which causes the core server 102 to add to a feed a corresponding content item of a webpage not within the network of social-networking communities 100. If a feed has been designated as a default feed, via a flag entered when the feed is created, the content item will be added to that feed by default. If none of the feeds have been designated as a default feed, the core server 102 provides a dialog box in the member's browser, which enables the member to select to which user feed the content item is to be added. For example, FIG. 7B illustrates an exemplary dialog box in which a member can select to which feed a content items is added.

IV. ExemplarySystem Architecture

The present invention (i.e., core server 102, servers 104 and 106, and computers 110 through 114 or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

Figure 9:
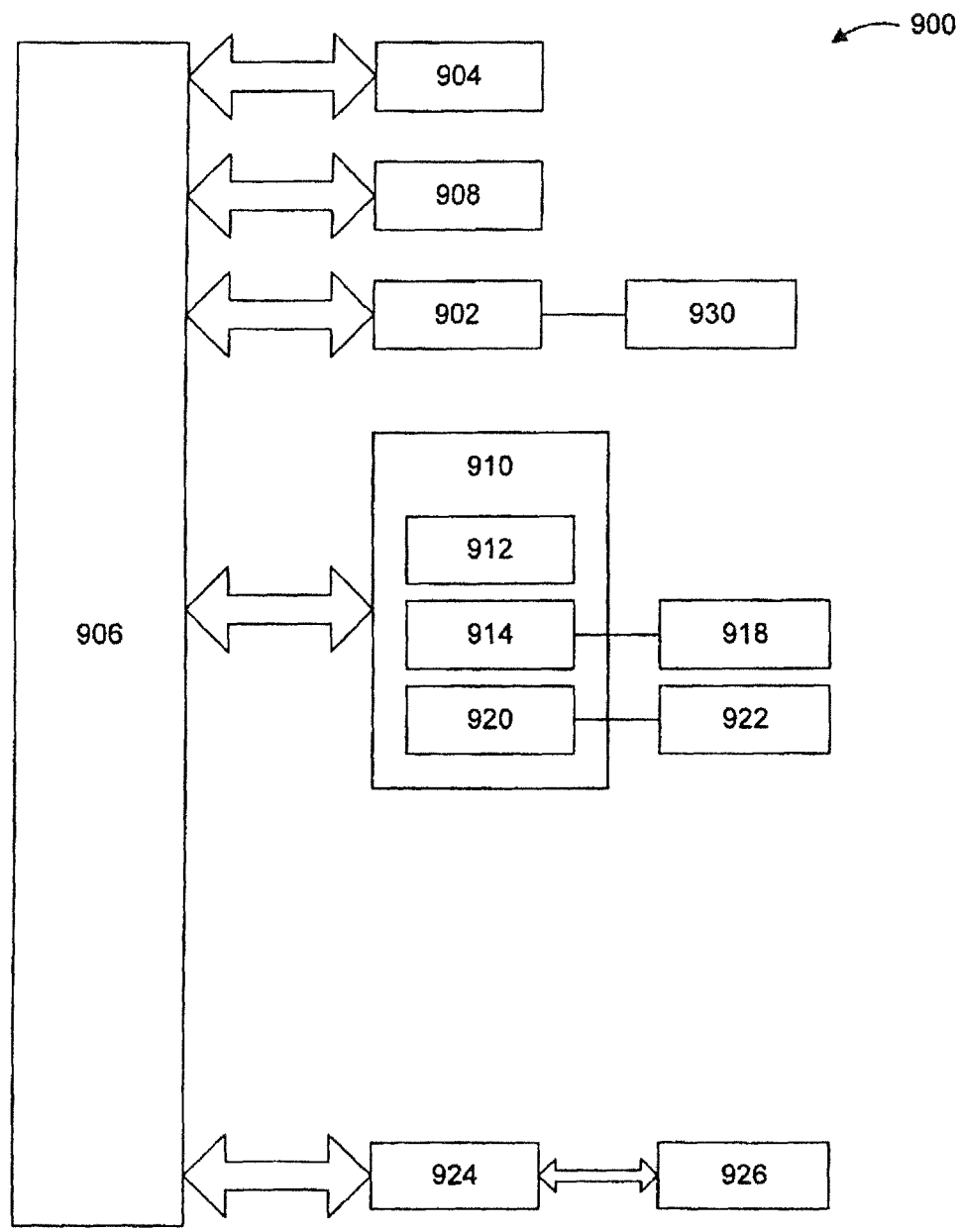
FIG. 9 depicts a block diagram of a system architecture for implementing a core server such as that illustrated in FIG. 1.

In fact, in one exemplary embodiment, the present invention employs one or more computer systems equipped to carry out the functions described herein. An example of such a computer system 900 is shown in FIG. 9.

Computer system 900 includes at least one processor 904. Processor 904 is connected to a communication infrastructure 906 (e.g., a communications bus, a cross-over bar device, or a network). Although various software embodiments are described herein in terms of this exemplary computer system 900, after reading this description, it will become apparent to a person skilled in the relevant art(s) how to implement the invention using other computer systems and/or architectures.

Computer system 900 includes a display interface (or other output interface) 902 that forwards graphics, text, and other data from communication infrastructure 906 (or from a frame buffer (not shown)) for display on a display unit (or other output unit) 230.

Computer system 900 also includes a main memory 908, which preferably is a random access memory (RAM), and also may include a secondary memory 910. Secondary memory 910 may include, for example, a hard disk drive 912 and/or a removable-storage drive 914 (e.g., a floppy disk drive, a magnetic tape drive, an optical disk drive, and the like). Removable-storage drive 914 reads from and/or writes to a removable storage unit 918 in a well-known manner. Removable storage unit 918 may be, for example, a floppy disk, a magnetic tape, an optical disk, and the like, which is written to and read from by removable-storage drive 914. Removable storage unit 918 can include a computer-usable storage medium having stored therein computer software and/or data.

In alternative embodiments, secondary memory 910 may include other similar devices for allowing computer programs or other instructions to be loaded into computer system 900. Such devices may include a removable storage unit 922 and an interface 920 (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 922 and interfaces 920 that allow software and data to be transferred from removable storage unit 922 to computer system 900.

The secondary memory 910 may have stored therein a plurality of software modules, each of which includes control logic for performing one or more functions described herein. Although specific examples of such software modules are provided, those skilled in the art will understand that other software modules providing similar functionality may be employed without departing from the scope of the present invention.

For example, the secondary memory 910 may include operating system software, such as Windows® NT, for example. The operating system software, when executed by the processor 904, enables the computer system 900 to communicate via the network 108, for example using Transmission Control Protocol/Internet Protocol (TCP/IP) based communications protocols.

The secondary memory 910 also may have stored therein database management software stored therein. For example, the secondary memory 910 may include Windows® SQL Server relational database management system software, which, when executed by the processor 904, enables the processor 904 to store data to and retrieve data from the secondary memory 910 using Structured Query Language (SQL).

The secondary memory 910 also may have stored therein webserver software and web browser software. For example, the secondary memory 910 may include Windows® Internet Information Services (IIS) software, which, when executed by the processor 904, enables the processor 904 to generate Hypertext Markup Language (HTML) documents, and to send and receive information using the Hypertext Transfer Protocol (HTTP) and the Hypertext Transfer Protocol over Secure Socket Layer Protocol (HTTPS). In addition, secondary memory 910 may include Microsoft Internet Explorer® software, which, when executed by the processor 904, enables the processor 904 to display HTML documents, and to send and receive information using the HTTP and HTTPS.

The secondary memory 910 also may have social-networking management software stored therein. For example, the secondary memory 910 may include software that enables generation of HTML code for webpage of a social-networking community. In addition, the social-networking management software may enable the core server 102 to provide a social-networking Application Programming Interface (API). For example, the secondary memory 910 may store Simple Object Access Protocol (SOAP) software that enables the processor 904 to send and receive API responses and requests, respectively. Further, the social-networking management software may enable the computer system 900 to generate widgets or software code that provide social-networking features to websites of social-networking systems.

Computer system 900 also may include a communications interface 924, which enables software and data to be transferred between computer system 900 and external devices (not shown). Examples of communications interface 924 may include a modern, a network interface (e.g., an Ethernet card), a communications port (e.g., a Universal Serial Bus (USB) port or a FireWire® port), a Personal Computer Memory Card International Association ("PCM- CIA") interface, and the like. Software and data transferred via communications interface 924 are in the form of signals, which may be electronic, electromagnetic, optical or another type of signal that is capable of being transmitted and/or received by communications interface 924. Signals are provided to communications interface 924 via a communications path 926 (e.g., a channel). Communications path 926 carries signals and may be implemented using wire or cable, fiber optics, a telephone line, a cellular link, a radio-frequency ("RF") link, or the like.

As used herein, the phrases "computer program medium" and "computer usable medium" may be used to generally refer to removable storage unit 918 used with removable-storage drive 914, a hard disk installed in hard disk drive 912, and signals, for example. These computer program products provide software to computer system 900. The present invention may be implemented or embodied as one or more of such computer program products.

Computer programs (also referred to as computer control logic) are stored in main memory 908 and/or secondary memory 910. The computer programs also may be received via communications interface 924. Such computer programs, when executed, enable computer system 900 to perform the functions of the present invention, as described herein and shown in, for example, FIG. 2. In particular, the computer programs, when executed, enable the processor 904 to perform the functions of the present invention. Accordingly, such computer programs represent controllers of computer system 900.

In an embodiment where the present invention is implemented using software, the software may be stored in a computer program product and loaded into computer system 900 using removable-storage drive 914, hard drive 912, or communications interface 924. The control logic (software), when executed by processor 904, causes processor 904 to perform the functions of the present invention described herein.

In another exemplary embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s) in view of this description.

In yet another exemplary embodiment, the present invention is implemented using a combination of both hardware and software.

As will be appreciated by those of skill in the relevant art(s) in view of this description, the present invention may be implemented using a single computer or using a computer system that includes multiple computers each programmed with control logic to perform various of the above-described functions of the present invention.

The various embodiments of the present invention described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A method of creating a feed of content items to be shared within a network of social-networking communities, the method comprising:

generating, by a core server, a plurality of core user memeber identifiers respectively corresponding to a plurality of user members;

generating, by the core server, a plurality of community identifiers respectively each community identifier corresponding to a respective one of the social-networking communities, wherein each of the social-networking communities maintains separate account information for its user members that is inaccessible to other social-networking communities in the plurality of social-networking communities;

storing, by the core server, a plurality of core profiles, each core profile corresponding to a respective one of the core user member identifiers, wherein each of the core profiles includes community information, friend information and content information;

receiving a first request to create a feed on a first one of the social-networking communities, the first request being received from a first one of the core user members that is a registered member of the first social-networking community, the request community and including information for representing the feed, wherein the information includes a descriptor;

receiving a plurality of second requests to add content items to the feed;

storing each content item included in the plurality of second requests in association with the feed and in association with the first core user member, wherein each content item includes a desired content for a visitor to the first social-networking community to experience;

providing a webpage, the webpage being accessible to others of the core user members that are not registered members of the first social-networking community and including a feed representation showing for each content item the descriptor; and receiving and storing a modification permission generated by the first core user member indicating whether other core user members are permitted to modify the feed.

2. The method according to claim 1, wherein the descriptor is at least one of a title, a visual icon, a description, and a flag.

3. The method according to claim 1, wherein the content item is at least one of a text content item, a video content item, an audio content item, and a photographic content item.

4. The method according to claim 1, wherein the feed is a community feed, and wherein the first core user member is a registered publisher member of the first social-networking community.

5. The method according to claim 1, wherein the feed is a user member feed, and wherein the core user member is a registered user member of the first social-networking community, and wherein a second one of the core user members permitted to modify the feed is not a member of the first social-networking community.

6. The method according to claim 1, wherein the content item is at least one of a link to an external server that produces desired content for the visitor to experience, a thumbnail image associated with a friend user member, a display name associated with a friend user member, a play list, a photo album, and a music album.

7. The method according to claim 4, further comprising:
storing information for representing a plurality of community feeds corresponding to the first social-networking community.

8. The method according to claim 1, further comprising:
for each content item of the feed, storing a flag used to determine whether the visitor belongs to a designated category that is allowed to experience the content item.

9. The method according to claim 1, further comprising:
for each content item of the feed, storing a flag used to determine whether core user members of the social-networking community are allowed to share the content item.

10. The method according to claim 1, the method further comprising:
providing a multimedia renderer in the webpage, the multimedia renderer being configured to process the content item of the feed so that a core user member may experience the content item.

11. The method according to claim 2, the method further comprising:
transmitting information from the feed to an external multimedia renderer when at least one of the title, the visual icon, and the description is selected.

12. The method according to claim 1, the method further comprising:
updating the content item by replacing the content item with an updated version of the content item.

13. The method according to claim 1, further comprising providing a bookmarklet via which a further content item is requested to be added to the feed.

14. The method according to claim 4, wherein the webpage corresponds to a community landing webpage of the first social-networking community.

15. The method according to claim 5, wherein the webpage corresponds to a core user member profile webpage of the core user member of the first social-networking community.

16. The method according to claim 1, further comprising:
receiving a third request to organize a content item of the feed, the request including one of an instruction to delete the content item and an instruction to specify a visual layout associated with the content item;
updating the feed based on the third request; and
storing the updated feed.

17. The method according to claim 1, wherein permission to modify the feed includes one of permission to add a content item to the feed, update a content items of the feed and organize a content item of the feed.

18. A computer system including a processor and a memory storing control logic for causing the processor to create a feed of content items to be shared within a network of social-networking communities, the control logic comprising:
first computer-readable program code for generating a plurality of core user member identifiers respectively corresponding to a plurality of user members;
second computer-readable program code for generating a plurality of community identifiers respectively each community identifier corresponding to a respective one of the social-networking communities, wherein each of the social-networking communities maintains separate account information for its user members that is inaccessible to other social-networking communities in the plurality of social-networking communities;
third computer-readable code for storing a plurality of core profiles, each. core profile corresponding to a respective one of the core user member identifiers, wherein each of the core profiles includes community infomration, friend information and content information;
fourth computer readable code for causing the processor to receive a first request to create a feed, the first request being received from a first one of the core user members that is a registered member of a first one of the social-networking communities, the request including information for representing the feed, wherein the information includes a descriptor;
fifth computer-readable program code for causing the processor to receive a plurality of second requests to add content items to the feed;
sixth computer-readable program code for causing the processor to store each content item included in the plurality of second requests in association with the feed and in association with the first core user member, wherein each content item includes a desired content for a visitor to the first social-networking community to experience;
seventh computer-readable program code for causing the processor to provide a webpage, the webpage being accessible to others of the core user members that are not registered members of the first social-networking community and including a feed representation showing for each content item the descriptor; and
eighth computer-readable program code for receiving and storing a modification permission indicating whether other core user members are permitted to modify the feed.

19. The computer system according to claim 18, wherein the descriptor is at least one of a title, a visual icon, a description, and a flag.

20. The computer system according to claim 18, wherein the content item is at least one of a text content item, a video content item, an audio content item, and a photographic content item.

21. The computer system according to claim 18, wherein permission to modify the feed includes one of permission to add a content item to the feed, update a content items of the feed and organize a content item of the feed.

* * * * *

UNITED STATES PATENT AND TRADEMARK OFFICE
CERTIFICATE OF CORRECTION

PATENT NO. : 11,392,961 B2
APPLICATION NO. : 16/210949
DATED : July 19, 2022
INVENTOR(S) : Karelin et al.

It is certified that error appears in the above-identified patent and that said Letters Patent is hereby corrected as shown below:

In the Claims

Claim 1, Column 26, Line 20:
"memeber identifiers respectively corresponding to a" should read "member identifiers respectively corresponding to a".

Signed and Sealed this
Thirteenth Day of December, 2022

Katherine Kelly Vidal
*Director of the United States Patent and Trademark Office*